(12) United States Patent
Golden et al.

(10) Patent No.: US 8,512,499 B2
(45) Date of Patent: Aug. 20, 2013

(54) FLUTED FILTER MEDIUM AND PROCESS FOR ITS MANUFACTURE

(75) Inventors: Patrick Golden, Roseville, MN (US); Gregory L. Reichter, Bloomington, MN (US); Daniel T. Risch, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/207,978

(22) Filed: Aug. 11, 2011

(65) Prior Publication Data

US 2011/0297611 A1 Dec. 8, 2011

Related U.S. Application Data

(62) Division of application No. 10/520,544, filed as application No. PCT/US03/02799 on Jan. 31, 2003, now Pat. No. 7,997,425.

(60) Provisional application No. 60/395,009, filed on Jul. 10, 2002.

(51) Int. Cl.
*B31F 1/20* (2006.01)
*B29C 65/00* (2006.01)
*B29C 63/00* (2006.01)

(52) U.S. Cl.
USPC ............ 156/210; 55/521; 156/60; 264/171.1; 210/493.4; 210/767; 210/321.74; 210/321.64; 210/497.1

(58) Field of Classification Search
USPC ........... 210/493.1, 493.5; 55/521; 264/171.1
See application file for complete search history.

(56) References Cited

U.S. PATENT DOCUMENTS

| | | |
|---|---|---|
| 891,428 A | 6/1908 | Latus |
| 1,729,135 A | 9/1929 | Slauson |
| 2,019,186 A | 10/1935 | Kaiser |
| 2,038,071 A | 4/1936 | Wilhelm |
| 2,190,886 A | 2/1940 | Schaaf et al. |
| 2,397,759 A | 4/1946 | Sigmund |
| 2,599,604 A | 6/1952 | Bauer et al. |
| 3,020,977 A | 2/1962 | Huppke et al. |
| 3,025,963 A | 3/1962 | Bauer |
| 3,025,964 A | 3/1962 | Summers et al. |
| 3,037,637 A | 6/1962 | Bub |

(Continued)

FOREIGN PATENT DOCUMENTS

| | | |
|---|---|---|
| EP | 0 087 067 | 8/1983 |
| EP | 0 556 932 | 8/1993 |

(Continued)

OTHER PUBLICATIONS

Translation of Response of Opposer Mann & Hummel to Patent Proprietor Reply, submitted to the EPO on Jul. 30, 2012.

(Continued)

*Primary Examiner* — Krishnan S Menon
*Assistant Examiner* — Dirk Bass
(74) *Attorney, Agent, or Firm* — Merchant & Gould P.C.

(57) ABSTRACT

An approach to providing folded flute ends in z-filter media is provided. The approach generally involves providing an initial deformation in a flute or corrugation to form at least one foldable tip and then folding the at least one foldable tip over. Techniques for both supported deformation and unsupported deformation are provided. Preferred corrugated media having fold arrangements, filter constructions having such fold arrangements, and filter system using such filter constructions are provided.

11 Claims, 34 Drawing Sheets

(56) References Cited

U.S. PATENT DOCUMENTS

| | | |
|---|---|---|
| 3,070,937 A | 1/1963 | Bub |
| 3,076,554 A | 2/1963 | Bub |
| 3,112,184 A | 11/1963 | Hollenbach |
| 3,112,262 A | 11/1963 | Parkinson |
| 3,323,963 A | 6/1967 | Summers |
| 3,346,121 A | 10/1967 | Bally |
| 3,372,533 A | 3/1968 | Rummel |
| 3,401,803 A | 9/1968 | Bub |
| 3,640,396 A | 2/1972 | Brownell |
| 3,859,068 A | 1/1975 | McLaren et al. |
| 4,039,457 A | 8/1977 | Schacht et al. |
| 4,181,513 A | 1/1980 | Fukuda et al. |
| 4,310,419 A | 1/1982 | Nara et al. |
| 4,410,427 A | 10/1983 | Wydeven |
| 4,430,223 A | 2/1984 | Miyakawa et al. |
| 4,439,321 A | 3/1984 | Taki et al. |
| 4,441,899 A | 4/1984 | Takagi et al. |
| 4,460,388 A | 7/1984 | Fukami et al. |
| 4,512,891 A | 4/1985 | Wright et al. |
| 4,589,983 A | 5/1986 | Wydevan |
| 4,652,286 A | 3/1987 | Kusuda et al. |
| 4,695,300 A | 9/1987 | Takagi |
| 4,704,863 A | 11/1987 | Abthoff et al. |
| 4,728,426 A | 3/1988 | Rudinger et al. |
| 4,925,561 A | 5/1990 | Ishii et al. |
| 5,002,666 A | 3/1991 | Matsumoto et al. |
| 5,015,379 A | 5/1991 | Drori |
| 5,049,326 A | 9/1991 | Matsumoto et al. |
| 5,063,007 A | 11/1991 | Gabathuler et al. |
| 5,066,432 A | 11/1991 | Gabathuler et al. |
| 5,174,895 A | 12/1992 | Drori |
| 5,316,676 A | 5/1994 | Drori |
| 5,322,537 A | 6/1994 | Nakamura et al. |
| 5,405,422 A | 4/1995 | Ueda et al. |
| 5,405,423 A | 4/1995 | Haerle |
| 5,435,870 A | 7/1995 | Tagaki et al. |
| 5,512,075 A | 4/1996 | Ninomiya et al. |
| 5,562,825 A | 10/1996 | Yamada et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| D428,128 S | 7/2000 | Gillingham et al. |
| 6,179,890 B1 | 1/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,291 B1 | 2/2002 | Gieseke et al. |
| 6,416,605 B1 | 7/2002 | Golden |
| 6,610,126 B2 | 8/2003 | Xu et al. |
| 6,887,343 B2 | 5/2005 | Schukar et al. |
| 2003/0121845 A1 | 7/2003 | Wagner et al. |

FOREIGN PATENT DOCUMENTS

| | | |
|---|---|---|
| GB | 703823 | 2/1954 |
| GB | 868058 | 5/1961 |
| GB | 1213219 | 11/1970 |
| GB | 1579881 | 11/1980 |
| GB | 1579882 | 11/1980 |
| GB | 1579883 | 11/1980 |
| JP | 64-38121 | 2/1989 |
| JP | 1-171615 | 7/1989 |
| JP | 1-207112 | 8/1989 |
| JP | 2-25009 | 2/1990 |
| JP | H3-7911 | 1/1991 |
| JP | 4-300612 | 10/1992 |
| JP | 9-267015 | 10/1997 |
| JP | 2001-310402 | 4/2000 |
| WO | 97/40918 | 11/1997 |
| WO | 01/37963 | 5/2001 |

OTHER PUBLICATIONS

Reply to Patent Proprietor Donaldson to Notice of Opposition, submitted to the EPO on Jul. 2, 2012.

Translation of opposition by Opposer Mann & Hummel to EP 1521627, submitted to the EPO on Nov. 16, 2011.

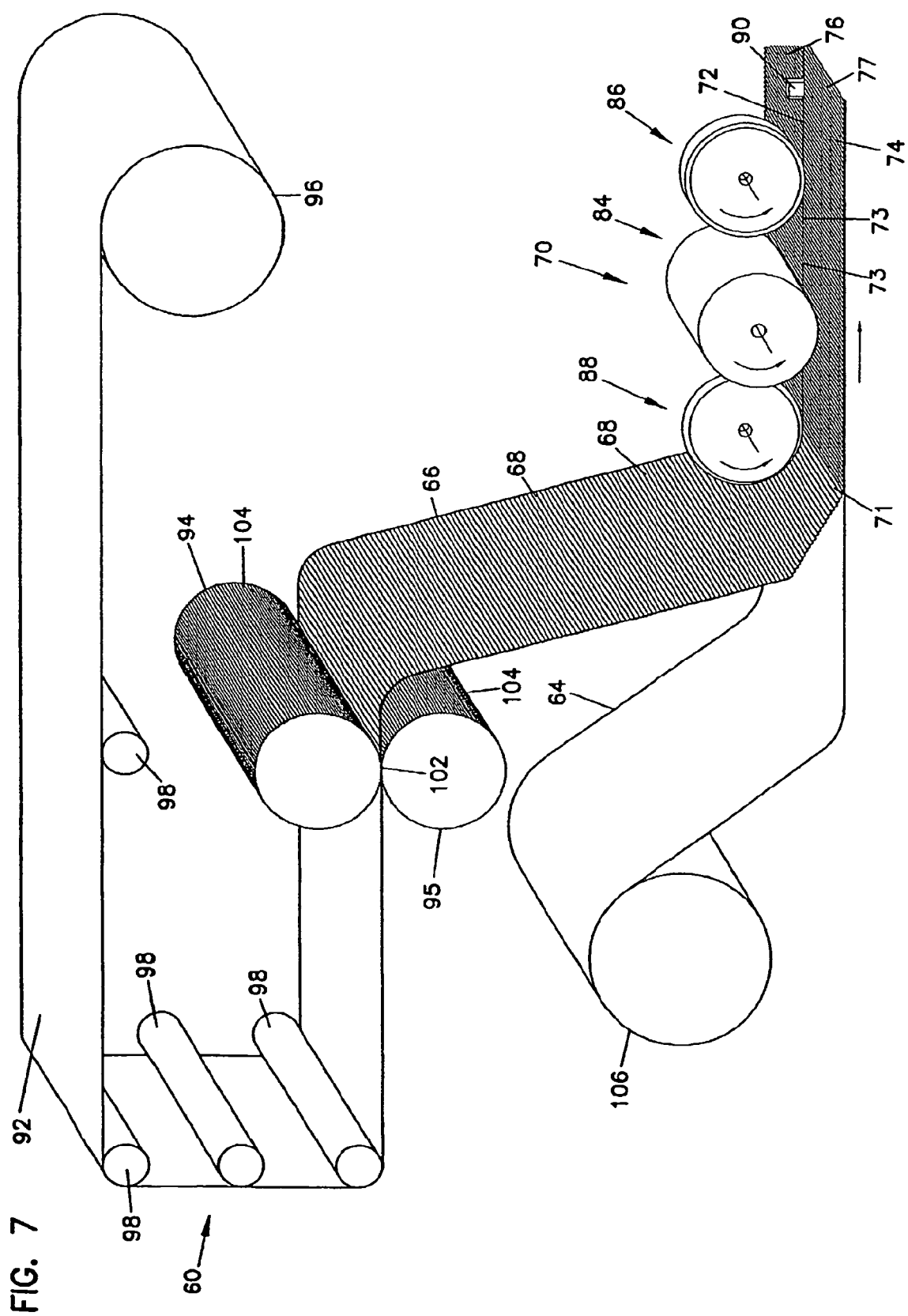

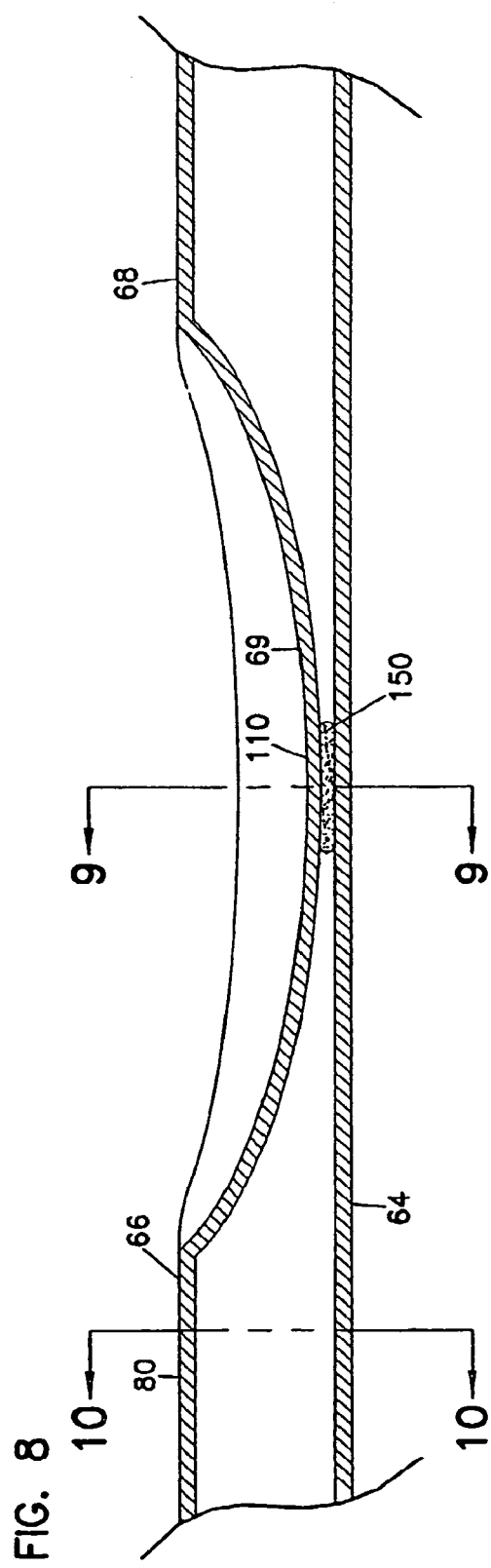
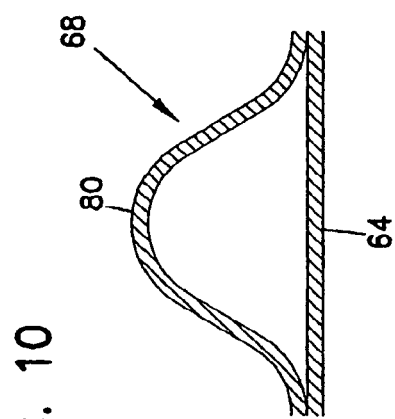
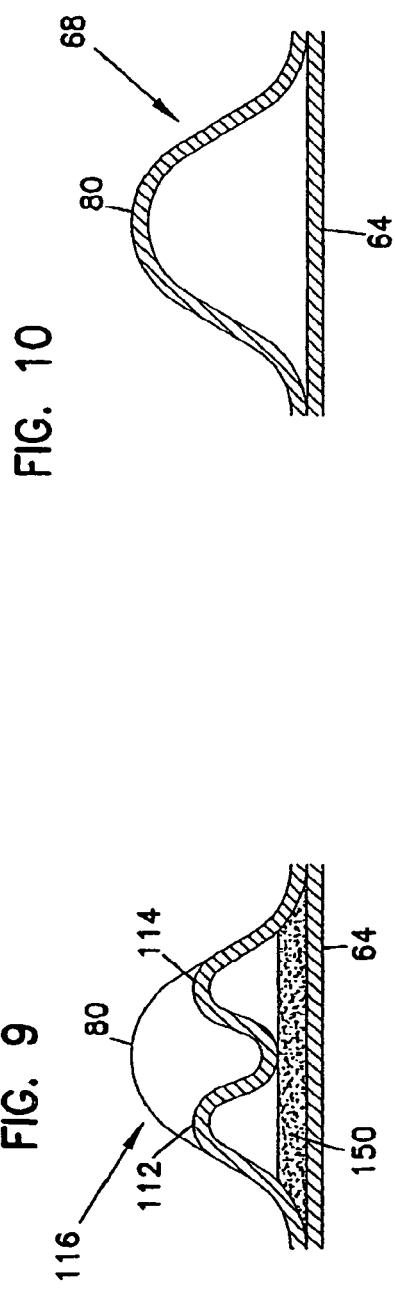

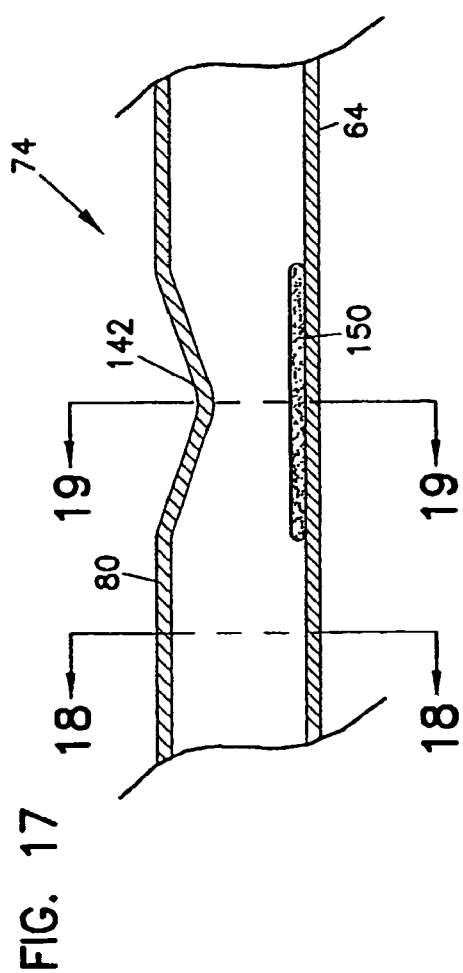
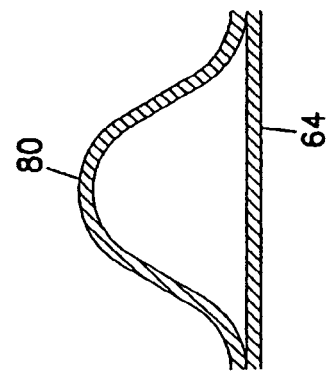
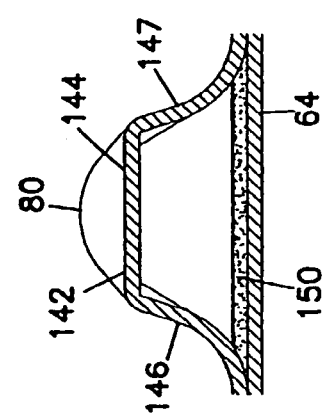

FLUTED FILTER MEDIUM AND PROCESS FOR ITS MANUFACTURE

This application is being filed as a Divisional of U.S. Ser. No. 10/520,544, filed 1 Jul. 2005, which is a National Stage of PCT International Patent Application No. PCT/US2003/002799, filed 31 Jan. 2003 in the name of Donaldson Company, Inc., a U.S. national corporation and resident, (Applicant for all countries except US); Patrick Golden, a U.S. resident and citizen (Applicant for US only); Gregory L. Reichter, a U.S. resident and citizen (Applicant for US only) and Daniel T. Risch, a U.S. resident and citizen (Applicant for U.S. only), which claims benefit of U.S. Provisional Ser. No. 60/395,009, filed 10 Jul. 2002 and which applications are incorporated herein by reference. To the extent appropriate, a claim of priority is made to each of the above disclosed applications.

FIELD OF THE DISCLOSURE

The present disclosure relates to filter media for use in filtering liquids or gases. The disclosure particularly relates to such media that utilizes a corrugated structure, to define filtration flutes or surfaces. Specifically, the disclosure relates to techniques for modifying such flutes in selected portions thereof, and to resulting structures.

BACKGROUND

Fluid streams, such as air and liquid, carry contaminant material therein. In many instances, it is desired to filter some or all of the contaminant material from the fluid stream. For example, air flow streams to engines for motorized vehicles or for power generation equipment, gas streams to gas turbine systems and air streams to various combustion furnaces, carry particulate contaminant therein that should be filtered. Also liquid streams in engine lube systems, hydraulic systems, coolant systems or fuel systems, carry contaminant, that should be filtered. It is preferred for such systems, that selected contaminant material be removed from (or have its level reduced in) the fluid. A variety of fluid filter (air or liquid filter) arrangements have been developed for contaminant reduction. In general, however, continued improvements are sought.

SUMMARY

The present disclosure concerns folded flute ends of fluted filter media, and to techniques for folding. It also concerns preferred filter arrangements constructed utilizing media having flutes with folded ends.

A variety of methods for folding media are described herein. In general, a common feature to each is that the media folding includes a step of deforming a media flute, typically through an indentation or projection against an outside surface of the flute. Follow up folding steps cause preferred folded configurations to result.

A portion of this disclosure is based upon, and priority is claimed to, U.S. provisional application Ser. No. 60/395,009, filed Jul. 10, 2002. In that priority document, a preferred folded or darted media configuration was shown, along with a process for forming the preferred configuration. In general, the process involved directing an indentation pin arrangement against a ridge of a corrugation.

In addition to the disclosure of U.S. provisional application Ser. No. 60/395,009 contained herein, there are provided additional techniques applicable to provide preferred fold arrangements. Certain of these techniques are generally referred to as "supported" processes, methods or techniques and relate to supporting a portion of the flute in the vicinity of the deformation. In addition, preferred arrangements for providing flute support during deformation, are described.

BRIEF DESCRIPTION OF THE DRAWINGS

In the following drawings, relative dimensions and material thickness may be shown exaggerated for clarity.

FIG. 7 is a schematic view of a process, including method steps, usable to prepare z-filter media having folded ends of selected flutes.

FIG. 8 is a cross-sectional view of a flute after contact with an inverter wheel of FIG. 7, and before contact with a folder wheel of FIG. 7.

FIG. 9 is a cross-sectional view of a flute taken along line 9-9 of FIG. 8.

FIG. 10 is a cross-sectional view of a flute taken along line 10-10, FIG. 8.

FIG. 17 is a cross-sectional view of a portion of filter media after contact with the creaser wheel of FIG. 16 and before contact with the inverter wheel of FIG. 20.

FIG. 18 is a cross-sectional view of a flute taken along line 18-18 of FIG. 17.

FIG. 19 is a cross-sectional view of a flute taken along line 19-19, FIG. 17.

DETAILED DESCRIPTION

I. Media Configurations Using Corrugated Media, Generally

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of parallel longitudinal inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; D437, 401.

Figure 11:
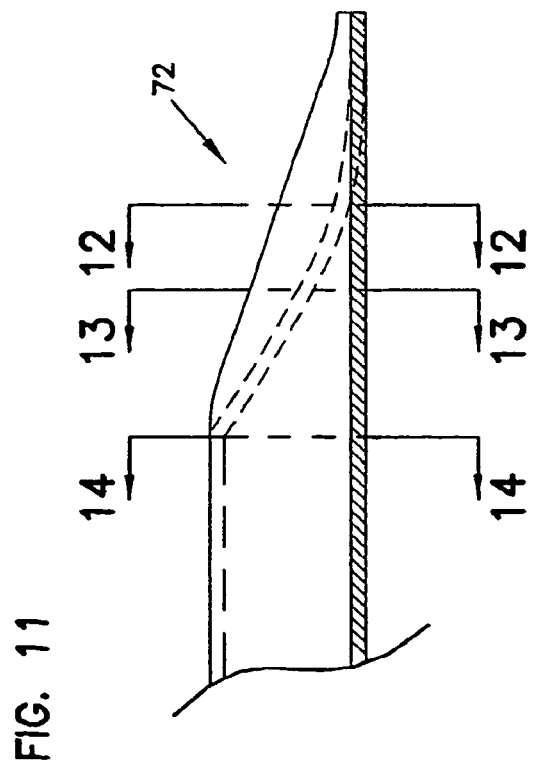
FIG. 11 is a cross-sectional view of a flute after contact with a folder wheel of FIG. 7.

One particular type of z-filter media, utilizes two specific media components joined together, to form the media construction. The two components are: a corrugated (or fluted) sheet; and, a non-corrugated (or facing) sheet. The corrugated (or fluted) media and non-corrugated (or facing) sheet together, are used to define the parallel inlet and outlet flutes. In some instances, the corrugated sheet and non-corrugated sheet are secured together and are then coiled to form a z-filter media construction. Such arrangements are described, for example, in U.S. Pat. Nos. 6,235,195 and 6,179,890. In certain other arrangements, some non-coiled sections of corrugated media secured to flat media, are stacked on one another, to create a filter construction. An example of this is described in FIG. 11 of U.S. Pat. No. 5,820,646.

The term "corrugated" used herein to refer to structure in media, is meant to refer to a structure resulting from passing the media between two corrugation rollers, i.e., into a nip or bite between two rollers each of which has surface features appropriate to cause a corrugation affect in the resulting media. The term "corrugation" is not meant to refer to flutes that are folded or otherwise formed by techniques not involving passage of media into a bite between corrugation rollers. However, the term "corrugated" is meant to apply even if the media is further modified or deformed after corrugation, for example by the folding techniques described herein.

Corrugated media is a specific form of fluted media. Fluted media is media which has individual flutes (for example formed by corrugating or folding) extending thereacross.

Serviceable filter element configurations utilizing z-filter media are sometimes referred to as "straight through flow configurations" or by variants thereof. In general in this context what is meant is that the serviceable filtered elements generally have an inlet flow face and an opposite exit flow face, with flow entering and exiting the filter cartridge in generally the same straight through direction. The term "serviceable" in this context is meant to refer to a media containing filter cartridge that is periodically removed and replaced from a corresponding fluid cleaner.

The straight through flow configuration is in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter the flow enters the cylindrical filter cartridge through a side, and then turns to exit through an end face (in forward-flow systems). In reverse-flow systems, the flow enters the serviceable cylindrical cartridge through an end face and then turns to exit through a side of the filter cartridge. An example of a reverse-flow system is shown in U.S. Pat. No. 5,613,992, incorporated by reference herein.

Figure 1:
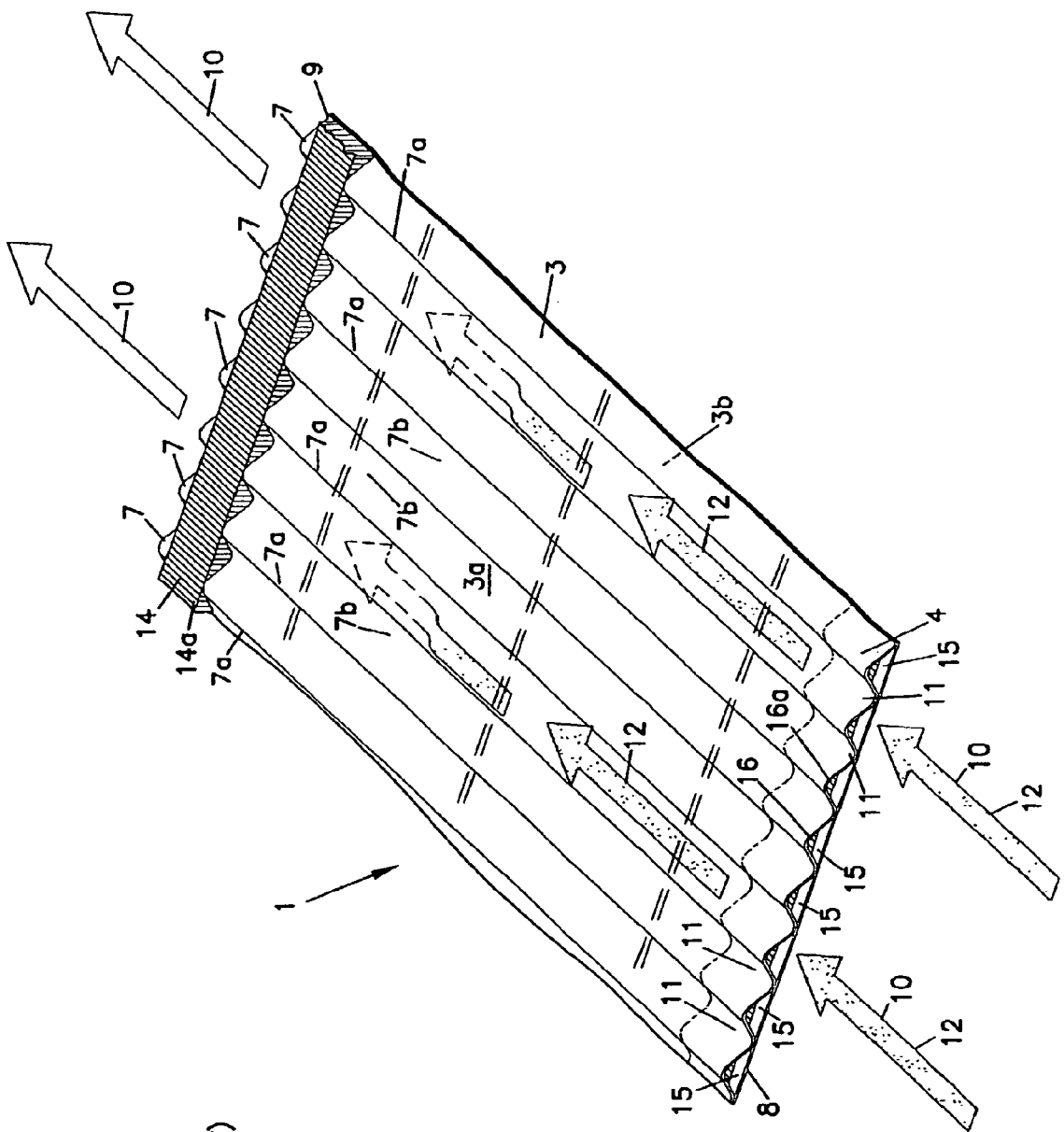
FIG. 1 is a schematic perspective view of prior art z-filter media.
Figure 2:
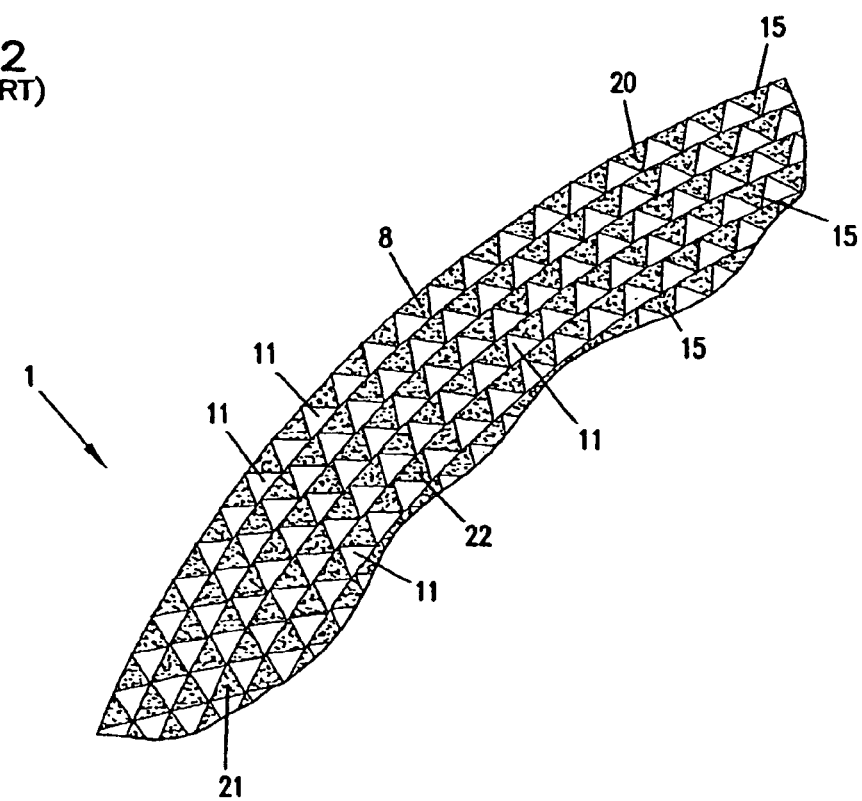
FIG. 2 is a schematic upstream end view of a filter element utilizing coiled media according to FIG. 1.
Figure 3:
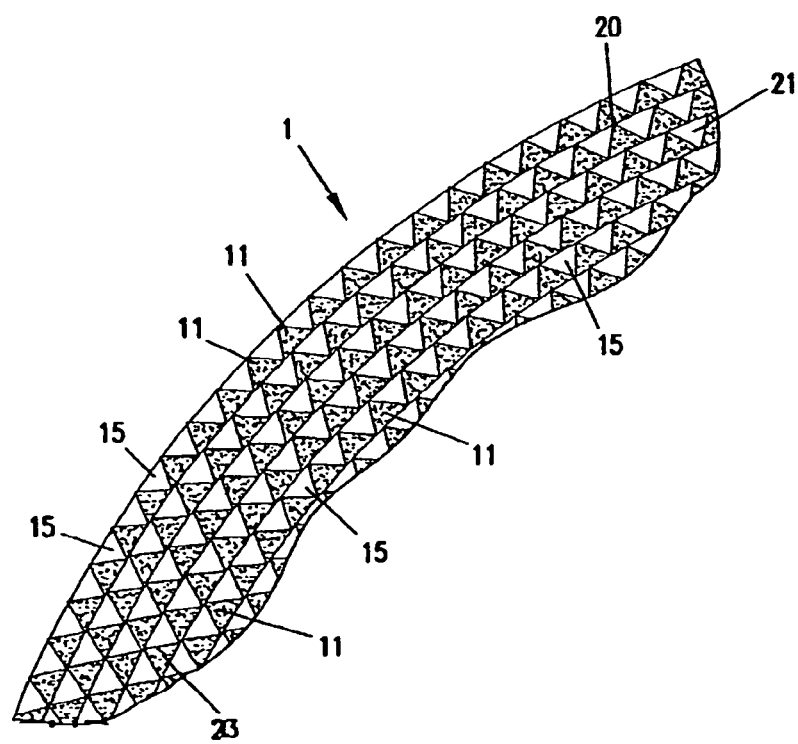
FIG. 3 is a schematic outlet end view of the arrangement depicted in FIG. 1.
Figure 4:
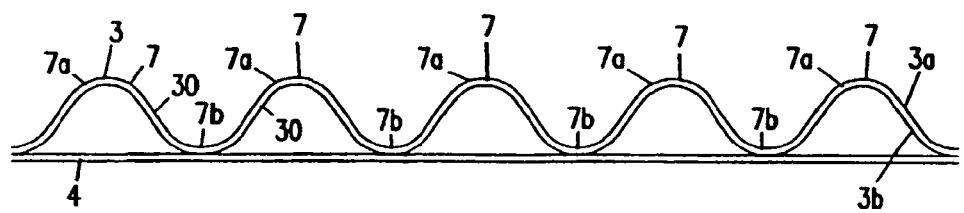
FIG. 4 is a schematic enlarged fragmentary view of a portion of corrugated media attached to a portion of uncorrugated media, in a z-filter construction.

An example of a typical prior art z-filter media construction is shown in FIGS. 1-4. FIG. 1 is based on the disclosure of prior art U.S. Pat. No. 5,820,646, at FIG. 1. FIG. 2 is an enlarged end view of an inlet end portion of a straight through flow filter element using a media construction made with the media shown in FIG. 1. FIG. 3 is an enlarged end view of and analogous to FIG. 2, but of an opposite, outlet, end. FIG. 4 is an enlarged, schematic, view of a combination of corrugated sheet and non-corrugated sheets.

The term "z-filter media construction" and variants thereof as used herein, is meant to refer to any or all of: a web of corrugated or otherwise fluted media secured to non-corrugated (facing) media with appropriate sealing to allow for definition of inlet and outlet flutes; or, such a media coiled or otherwise constructed or formed into a three dimensional network of inlet and outlet flutes; and/or, a filter construction including such media.

Referring to FIG. 1, the z-filter media construction 1 depicted comprises a corrugated sheet 3, and a non-corrugated sheet 4 secured to one another. The corrugated sheet 3 is secured to the non-corrugated sheet 4 such that individual flutes or corrugations 7 (comprising ridges 7a and troughs 7b when viewed toward side 3a of sheet 3) extend across the non-corrugated sheet 4 between opposite ends or edges 8 and 9. For the final product, it is a matter of choice whether end (or edge) 8 or end (or edge) 9 is the upstream end or edge. For purposes of the following discussion, it will be assumed that edge 8 is chosen to be the upstream edge and edge 9 is chosen to be the downstream edge, in the resulting filter media construction. Thus, arrows 10 indicate the direction of fluid flow, during filtering.

Referring to FIG. 1, the corrugated sheet 3 has first and second opposite sides or surfaces 3a, 3b. The second side 3b is the side directed toward the non-corrugated sheet 4, during initial assembly of the corrugated sheet 3/flat sheet 4 combination as discussed below; i.e., when the corrugated sheet 3 is first brought into contact with the non-corrugated sheet 4. At the upstream edge 8, flutes 11 defined by troughs 7b of the corrugations 7 above the corrugated sheet 3, i.e., at side 3a of sheet 3 are open to fluid flow therein in the direction of arrows 12, along the upstream edge 8, but are closed to fluid flow therefrom along the downstream edge 9, by barrier 14, in this instance sealant 14a. On the other hand, flutes 15, defined by corrugations 7a on the opposite side 3b of the corrugated sheet 3 from flutes 11, are closed to entrance of fluid therein along the upstream edge 8, by barrier 16, in this instance sealant 16a, but are open to fluid flow outwardly therefrom, along edge 9, by the absence of any sealant at this location.

Of course in the arrangement of FIG. 1, the media is shown not secured in an overall three-dimensional filter element cartridge structure, that would complete creation of the isolated parallel flutes 11, 15. This is shown in fragmentary, schematic, in FIG. 2. Referring to FIG. 2, the media construction 1 is now shown configured in an overall three-dimensional media pack 20. In general media pack 20, for the embodiment shown, would comprise the media construction 1 of FIG. 1, coiled about itself to create a cylindrical fluted construction 21. A complete drawing would typically show a circular or obround filter body. In FIG. 2, only a portion of such a coiled construction 21 is depicted, in particular a portion when viewed toward an upstream surface 22. Herein the term "upstream" when used in this or similar contexts to refer to a surface or edge, is meant to refer to the surface or edge toward which fluid is directed, for a filtering process. That is, the upstream surface or edge is the surface or edge at which the fluid to be filtered enters the z-filter construction 21. Analogously, the term "downstream" when used to refer to an edge or surface, is meant to refer to the edge or surface of a construction 21 from which filtered fluid exits the filtered media construction 21, during use.

It is noted that in FIGS. 2 and 3, the flutes 11, 15 are depicted schematically, as if they have triangular, cross-sections, for simplicity. The actual curved shape of FIG. 1 would be present in the actual filter.

Referring to FIG. 2, at upstream edge 8 or along upstream surface 22, the fluid flow openings in inlet flutes 11 are generally indicated by the absence of barrier or sealant. Thus inlet flutes 11 are open to the passage of fluid flow therein. The closed upstream ends of exit flutes 15 are also shown, by the presence of a barrier, in this instance sealant. Thus, fluid flow directed against upstream surface 22 can only pass into the media construction 20, for filtering, by entering the inlet flutes 11. It is noted that in some instances, at the upstream edge 8, the outlet flutes may not be sealed immediately at the edge 8, but rather may be sealed by a sealant spaced inwardly from the edge 8, a portion of the way down the length of the corresponding flute. An example of this is shown, for example, in U.S. Pat. No. 5,820,646, at FIG. 16 thereof. In general, the inlet end of an exit flute will be considered sealed, as long as the sealant or other structure closing the flute is located (relative to edge 8) either at the edge or no more than 25% (preferably no more than 10%) of the distance between the upstream edge 8 and the opposite downstream edge 9. Usually the sealing is at the edge 8. The description "no more than 25% (or 10%) of the distance between the upstream edge and the opposite downstream edge 9" in this context is meant to include sealing at edge 8.

Referring to FIG. 3, the exit edge 9 of the media, forming exit end or 23 of the filter construction 21. The exit flutes 15 are shown open, and the inlet flutes 11 are shown closed by barrier or sealant. The inlet flutes 11 will be considered sealed at the downstream ends, as long as the sealant material or other structure closing the flute, is at the exit edge 9, or within a distance from the edge 9 corresponding to no more than 25% of the distance between the opposite edges 8 and 9. For typical, preferred, embodiments the sealed end of each flute 8, 9 would be sealed by sealant positioned at a location within a distance from the closest edge of no more than 10% of the flute length from edge 8 to edge 9. Usually the sealing is at the edge 9. The description "no more than 25% (or 10%) of the flute length from edge 8 to edge 9" in this context, is meant to include sealing at edge 9.

In general, the corrugated sheet 3, FIG. 1 is of a type generally characterized herein as having a regular, curved, wave pattern of flutes or corrugations. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is present. The media could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the ends of the troughs and ridges may vary from one another. Such variations in ends are disregarded in the definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7a of each trough is formed along a radiused curve. A typical radius for such z-filter media would be at least 0.25 mm and typically be not more than 3 mm.

An additional characteristic of the particular regular, curved, wave pattern depicted in FIG. 4, for the corrugated sheet 3, is that at approximately a midpoint 30 between each trough and each adjacent ridge, along most of the length of the flutes, is located a transition region where the curvature inverts. For example, viewing face 3a, FIG. 1, trough 7b is a concave region, and ridge 7a is a convex region. Of course when viewed toward face 3b, trough 7b of side 3a forms a ridge; and, ridge 7a of face 3a, forms a trough.

A characteristic of the particular regular, curved, wave pattern corrugated sheet shown in FIGS. 1-4, is that the individual corrugations are generally straight. By "straight" in this context, it is meant that through at least 70%, typically at least 80% of the length between edges 8 and 9, the troughs do not change substantially in cross-section. The term "straight" in reference to corrugation pattern shown in FIGS. 1-4, in part distinguishes the pattern from the tapered flutes of corrugated media described in FIG. 1 of WO 97/40918. The tapered flutes of FIG. 1 of WO 97/40918 would be a curved wave pattern, but not a "regular" pattern, or a pattern of straight flutes, as the terms are used herein.

For the particular arrangement shown herein in FIG. 1, the parallel corrugations are generally straight completely across the media, from edge 8 to edge 9. However, herein embodiments are shown in which straight flutes or corrugations are deformed or folded at selected locations, especially at ends. Again, modifications at flute ends are generally disregarded in the above definitions of "regular," "curved" and "wave pattern."

Attention is again directed to FIG. 3 in which media pack 20 is depicted from a viewpoint directed toward downstream end 23 defined by edge 9 of the z-filter media construction 1. At this end or surface 23, the exit flutes 15 are depicted open and unsealed, and the entrance flutes 11, are shown closed by a barrier, in this case, by sealant. Thus, the only way fluid can exit from downstream end 23 is by flow outwardly from an open exit flute 15.

As a result of the above described construction, fluid which enters the inlet face 22 can only exit from the opposite exit face 23, if the fluid has passed through the filter media 3, 4. This, in general, is a characteristic of a z-filter media construction in use namely: (a) individual generally parallel flutes are defined by a media, for example corrugated media; and, (b) a closure pattern is provided closing exit flutes at the upstream end and closing inlet flutes at the downstream end, forcing fluid flow (with filtering) through one of the media sheets in order for the fluid to exit from the media pack.

In typical applications involving z-filter media, the media is either surrounded by an impermeable shell (as in U.S. Pat. No. 5,820,646), or seals are used at appropriate locations, or both, to prevent fluid flow from going around the media, from a fluid inlet to a fluid outlet.

Attention is again directed to FIG. 4, which is an enlarged, fragmentary, schematic, end view of the Z-filter media construction 1, showing the corrugated sheet 3 and the non-corrugated sheet 4, but not barrier or sealant. Again, the configuration of the corrugated sheet, in FIG. 4, will sometimes be referred to herein as a regular, curved, wave pattern of straight flutes.

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. Finally, in WO 97/40918 (FIG. 1), flutes or parallel corrugations which have a curved, wave patterns (from adjacent curved convex and concave troughs) but which taper along their lengths (and thus are not straight) are shown.

Before proceeding further with this description, the nature of the filter media is briefly discussed. In general the filter media is a relatively flexible material, typically a non-woven fibrous material (of cellulose fibers, synthetic fibers or both) typically including a resin therein, sometimes treated with additional materials. Thus, it can be conformed or configured into the various folded or corrugated patterns, without unacceptable media damage. Also, it can be readily coiled or otherwise configured for use, again without unacceptable media damage. Of course, it must be of a nature such that it will maintain a corrugated or folded configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. Thus, facing (noncorrugated) sheet is tacked to the fluted sheet, to inhibit this spring back.

Also, in general the media contains a resin. During the corrugation process, the media can be heated to above the glass transition point of the resin. When the resin then cools, it will help to maintain the fluted shapes.

Both of these techniques are generally known in practice, with respect to the formation of corrugated media.

An issue with respect to z-filter constructions relates to closing of the individual flute ends. In many instances a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this. In addition, the relatively large, impermeable surface area to fluid flow represented by the sealant areas, generally positioned perpendicular to flow through the media pack, create restriction to fluid flow.

Figure 5:
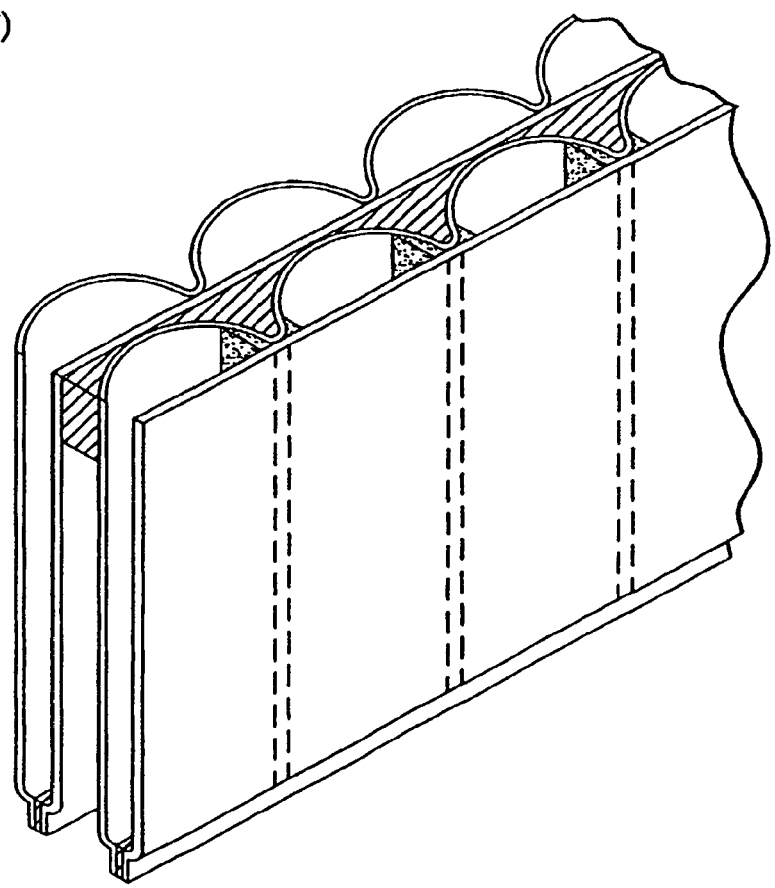
FIG. 5 is a figure from a prior art reference, specifically Yamada, et al. U.S. Pat. No. 5,562,825.

With respect to a particular configuration of straight fluted media, Yamada, et al. suggest addressing this issue at the downstream end of the media, by flattening the two media sheets together into a parallel configuration, see FIGS. 1 and 4 of Yamada, et al, U.S. Pat. No. 5,562,825. Yamada, et al. FIG. 4 is depicted herein as FIG. 5, without reference numerals. A flattening such as that found in Yamada, et al., leads to less sealant volume due to the crushing and potentially less leakage through the sealant, due to the compression.

In the disclosure of WO 97/40918, incorporated herein by reference, it was suggested that this sealant or closed volume/area issue could be addressed (at least with media having a regular, curved, wave pattern) by crushing along a sealant bead and then slitting.

A reference which generally shows a different type of crushing of flutes is U.K. 703,823, published Feb. 10, 1954.

Figure 6:
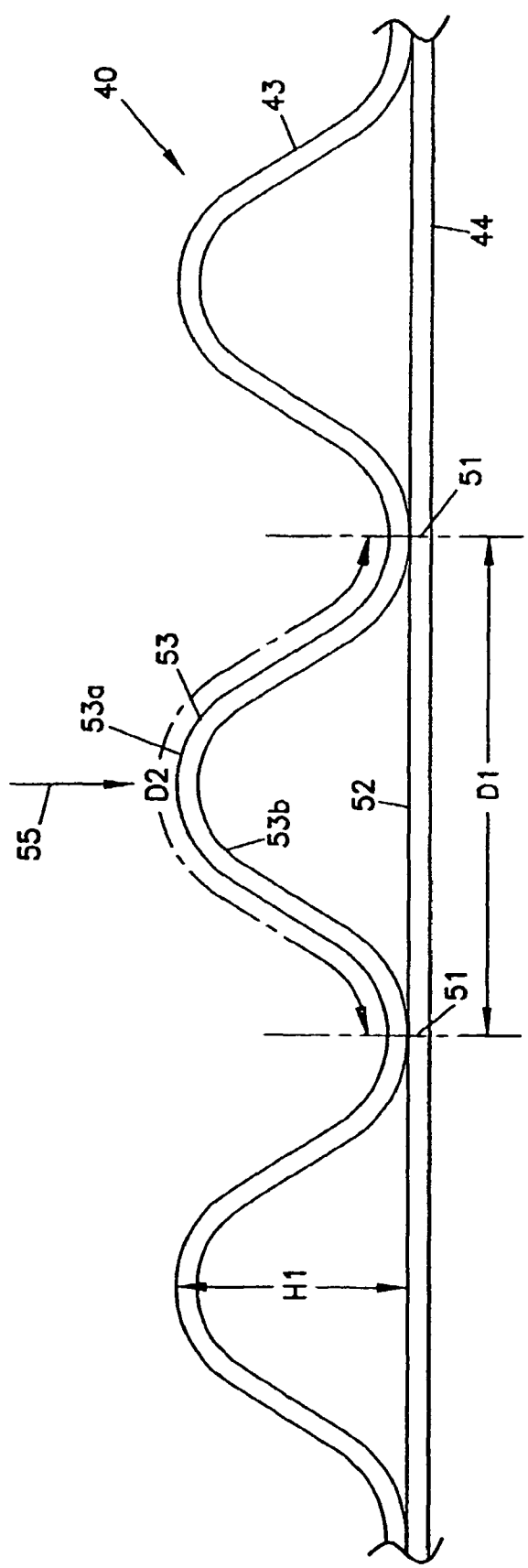
FIG. 6 is an enlarged view of a portion of the media depicted in FIG. 4.

Attention is now directed to FIG. 6, in which a z-filter media construction 40 utilizing a regular, curved, wave pattern corrugated sheet 43, and a non-corrugated flat sheet 44, is depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or medium draw for the corrugated media.

Figure 49:
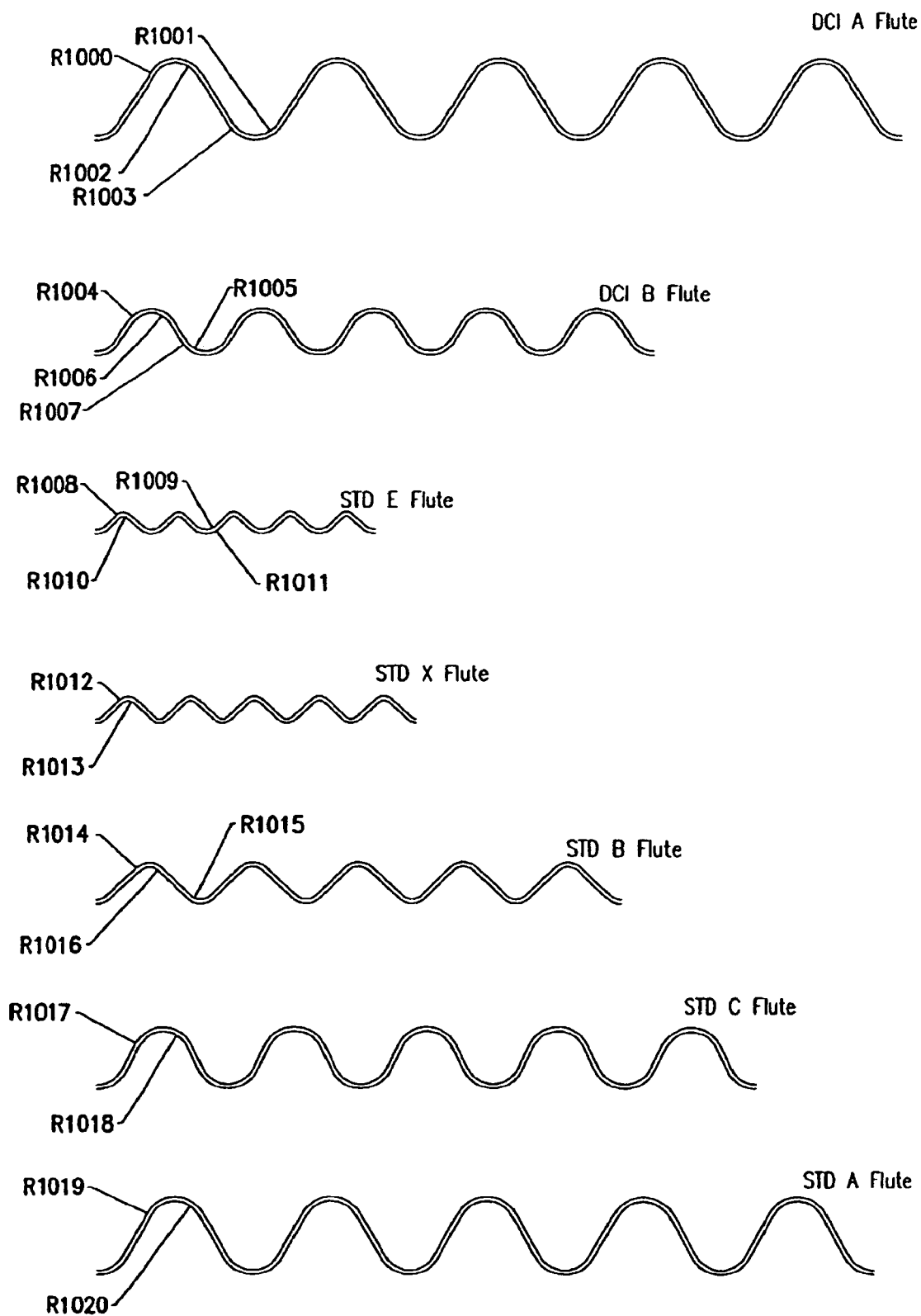
FIG. 49 is a schematic depiction of various flute definitions.

In the corrugated cardboard industry, various standard flutes have been defined. For example the standard E flute, standard X flute, standard B flute, standard C flute and standard A flute. FIG. 49, attached, in combination with Table A below provides definitions of these flutes.

Donaldson Company, Inc., (DCI) the assignee of the present disclosure, has used variations of the standard A and standard B flutes, in a variety of filter arrangements. These flutes are also defined in FIG. 49 and Table A.

TABLE A (Flute definitions for FIG. 49)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It should be apparent that once the length D2 of the corrugated media 53 exceeds D1 substantially, for example becomes 1.2 D1 or larger, accomplishing a consistent parallel squeeze or configuration such as that shown at the downstream edge in Yamada, et al., FIG. 4 herein, will be difficult, especially with significant line speeds (30 meters per minute or more). This is in part because there is often too much media in the corrugation 53 to line up evenly and in parallel with the flat media 44 in region 52 to achieve the configuration shown herein in FIG. 5, (i.e. in FIG. 4 of Yamada et al. U.S. Pat. No. 5,562,825).

In general, Donaldson Company, the assignee of the present disclosure, has determined that when the relationship between the flutes of corrugation sheet and the flat sheet is such that the flute/flat ratio or medium draw is at least 1.2 (i.e. the corrugation length (D2) is at least 1.2 times the linear flat sheet length (D1) in the region of closure, in some instances it is preferred to generate a regular fold pattern, to collapse the corrugation (flute) toward the flat sheet, and to reduce the sealant area at or near flute ends. By the term "regular fold pattern" in this context, it is meant that selected corrugated (flute) ends that are modified are folded into a regular and repeated pattern, as opposed to merely being crushed toward the flat sheet. One such regular fold pattern is illustrated herein in FIG. 15, and a method for generating it is described in commonly assigned U.S. provisional application 60/395,009, filed Jul. 10, 2002, to which priority is claimed. Such a fold pattern will generally be referred to herein as a "center darted" or "center dart" fold pattern, since it results from creating, a dart or indentation (deformation) at or near an apex of each flute, to be closed, with a follow-up step of folding. A pattern of fold steps that accomplishes this is discussed below in connection with FIGS. 7-24, and also in connection with FIGS. 28-47.

Herein, an end of a flute or corrugation will be characterized as closed by a "fold" or as being "folded" if it includes at least two creases therein, each crease resulting in a portion of the media being folded back on or over itself. The fold pattern in FIG. 15 has four such creases, discussed below. Preferred configurations include at least four folds or creases. The term "fold" is intended to be applicable, even if, when the media is folded back over itself, some structure or material, such as sealant, is positioned between adjacent layers of media.

II. The Folding Technique Described in U.S. Provisional Application 60/395,009, filed Jul. 10, 2002

A. Overview of Process and Resulting Darted Flute

In FIG. 7, one example of a manufacturing process for making center darts is shown schematically at 60. In general, the non-corrugated sheet 64 and the corrugated sheet 66 having flutes 68 are brought together to form a media web 71. The darting process occurs at station 70 to form center darted section 72 located mid-web. After the darting process, the z-filter media or Z-media 74 can be cut along the center darted section 72 to create two pieces 76, 77 of Z-media 74, each of which has an edge with a set of corrugations having folded ends.

Still referring to FIG. 7, it is noted that the process depicted generally involves formation of darts through folds occurring on a mid-line 73 of an associated media web 71. Such a process will be generally characterized herein as a "mid-web folding" or "mid-web darting" process. This is to distinguish from an edge folding or edge darting process, described below. Of course, the mid-web folding process shown in FIG. 7 is used to generate edge folds, once the web 71 is slit along fold line 73.

The process of deforming the flutes 68, as part of generating a regular fold pattern, takes place at station 70. The folding process shown, in general, involves inverting the ridges 80 of the flutes 68 and then pressing (or folding) the inverted ridges 80 against the non-corrugated sheet 64 to form the center darted section 72. In the embodiment shown, there are at least two rollers or wheels shown generally at 70 that are used to work the corrugated sheet 66. An indenting, inverting, or darting wheel 84 operates first to deform or invert the ridges 80, while a folder wheel 86 later presses or folds the inversions made by the darting wheel 84 into the non-corrugated sheet 64 to form the darted section 72.

FIG. 7 also shows an optional manipulation to the corrugated sheet 66 before encountering the darting wheel 86. The optional media manipulation includes engagement with a creaser wheel 88. The optional creaser wheel 88 engages the flutes 68 by initially nicking or temporarily deforming by pressing inwardly the ridges 80 toward the uncorrugated sheet 64. This can help to start the process of deformation and to help the flutes 68 to be appropriately deformed (inverted) by the darting wheel 86.

After engagement with the folder wheel 86, the step of cutting the Z-media 74 is shown. A splitter, blade or cutter is shown at 90 dividing the Z-media 74 into pieces 76, 77.

Still in reference to FIG. 7, before the Z-media 74 is put through the darting station 70, the Z-media 74 is formed. In the schematic shown in FIG. 7, this is done by passing a flat sheet of media 92 through a pair of corrugation rollers 94, 95. In the schematic shown in FIG. 7, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is routed to the darting process 70.

The type of corrugation provided to the corrugation media is a matter of choice, and will be dictated by the corrugation or corrugation teeth of the corrugation rollers 94, 95. A preferred corrugation pattern will be a regular curved wave pattern corrugation, of straight flutes, as defined herein above. In some instances the techniques may be applied with curved wave patterns that are not "regular" and do not use straight flutes. A typical regular curved wave pattern used, would be one in which the distance D2, as defined above, in a corrugated pattern is at least 1.2 times the distance D1 is defined above. In one preferred application, typically D2=1.25–1.35×D1.

Still in reference to FIG. 7, the process also shows the non-corrugated sheet 64 being routed to the darting process station 70. The non-corrugated sheet 64 is depicted as being stored on a roll 106 and then directed to the corrugated sheet 66 to form the Z-media 74. The corrugated sheet 66 and the non-corrugated sheet 64 are secured together at some point in the process, by adhesive or by other means (for example by sonic welding).

The process 60 shown in FIG. 7 can be used to create the center darted section 72. FIGS. 8-10 show one of the flutes 68 after initial deformation; e.g., after engaging the indenting or darting wheel 84 and before engaging the folder wheel 86. The darting wheel 84 deforms a portion 69 of the ridge 80, by indenting or inverting it. By "inverting" and variants thereof, it is meant that the ridge 80 is indented or turned inward in a direction toward the non-corrugated sheet 64. FIG. 9 is a cross-sectional view along the mid-point of the inversion 110 created by the darting wheel 84. The inversion 110 is between a pair of peaks 112, 114 that are created as a result of the darting process. The peaks 112, 114 together form a flute double peak 116. The peaks 112, 114 in the flute double peak 116 have a height that is shorter than the height of the ridge 80 before inversion. FIG. 10 illustrates the cross-section of the flute 68 at a portion of the flute 68 that did not engage the darting wheel 84, and thus was not deformed. As can be seen in FIG. 10, that portion of the flute 68 retains its original corrugated shape.

The particular process illustrated in FIGS. 7-24, is one of "center indenting," "center inverting," "center darting" or "center deformation." By the term "center" in this context, again, it is meant that the indentation or inversion occurred at an apex or center of the associated ridge 80, engaged by the indenting or darting wheel 84. A deformation or indent will typically be considered herein to be a center indent, as long as it occurs within 3 mm of the center of a ridge.

Again, herein the term "crease," "fold," or "fold line" are meant to indicate an edge formed by folding the media back on or over itself, with or without sealant or adhesive between portions of the media.

Figure 15:
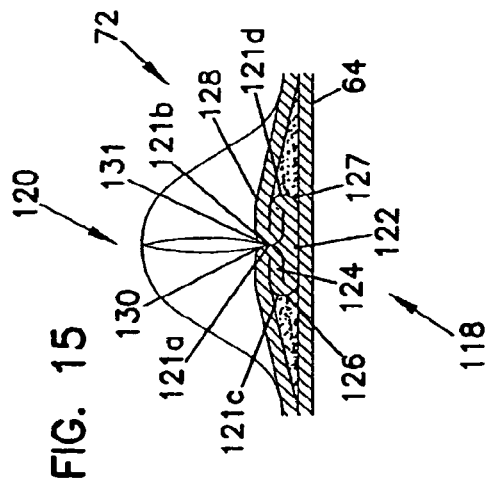
FIG. 15 is an end view of a folded flute depicted in FIG. 11.

Attention is now directed to FIGS. 11-15. FIGS. 11-15 show sections of the darted section 72 after engagement with the folder wheel 86. FIG. 15, in particular, shows an end view of the darted section 72, in cross-section. A fold arrangement 118 can be seen to form a darted flute 120 with four creases 121a, 121b, 121c, 121d. The fold arrangement 118 includes a flat first layer 122 that is secured to the non-corrugated sheet 64. A second layer 124 is shown pressed against the flat first layer 122. The second layer 124 is preferably formed from folding opposite outer ends 126, 127 of the first layer 122.

Still referring to FIG. 15, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 15. The term "inwardly directed" is meant to refer to the fact that the fold line or crease line of each crease 121a, 121b, is directed toward the other.

In FIG. 15, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 15. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 15. That is, they are not meant to be otherwise indicative of direction when the fold 120 is oriented in an actual product for use.

Based upon these characterizations and review of FIG. 15, it can be seen that a preferred regular fold arrangement 118 according to FIG. 15 in this disclosure is one which includes at least two "upper, inwardly directed, creases." These inwardly directed creases are unique and help provide an overall arrangement at which the folding does not cause a significant encroachment on adjacent flutes. These two creases result in part from folding tips 112, 114, FIG. 9, toward one another.

A third layer 128 can also be seen pressed against the second layer 124. The third layer 128 is formed by folding from opposite inner ends 130, 131 of the third layer 128. In certain preferred implementations, the non-corrugated sheet 64 will be secured to the corrugated sheet 66 along the edge opposite from the fold arrangement 118.

Another way of viewing the fold arrangement 118 is in reference to the geometry of alternating ridges 80 and troughs 82 of the corrugated sheet 66. The first layer 122 includes the inverted ridge 110. The second layer 124 corresponds to the double peak 116 that is folded toward, and in preferred arrangements, folded against the inverted ridge 110. It should be noted that the inverted ridge 110 and the double peak 116, corresponding to the second layer 124, is outside of the troughs 82 on opposite sides of the ridge 80. In the example shown, there is also the third layer 128, which extends from folded over ends 130, 131 of the double peak 116.

Figure 12:
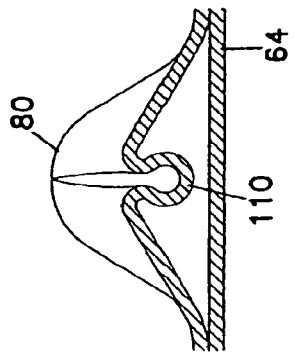
FIG. 12 is a cross-sectional view of a flute taken along line 12-12 of FIG. 11.
Figure 13:
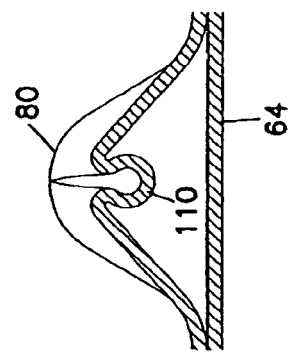
FIG. 13 is a cross-sectional view of a flute taken along line 13-13 of FIG. 11.
Figure 14:
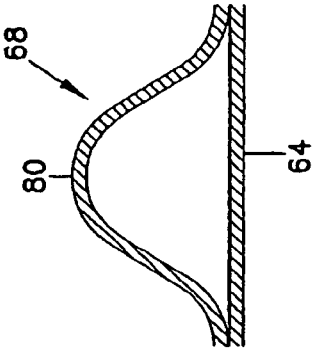
FIG. 14 is a cross-sectional view of a flute taken along line 14-14 of FIG. 11.

FIGS. 12-14 show the shape of the flute 68 at different sections. FIG. 14 shows an undeformed section of the flute 68. The inversion 110 can be seen in FIGS. 12 and 13 extending along from where it engages the non-corrugated sheet 64 (FIG. 15) to a point where it no longer exists (FIG. 14). In FIGS. 12 and 13, the inversion 110 is spaced at different lengths from the non-corrugated sheet 64.

B. Specific Example from Provisional Application 60/395,009

Figure 16:
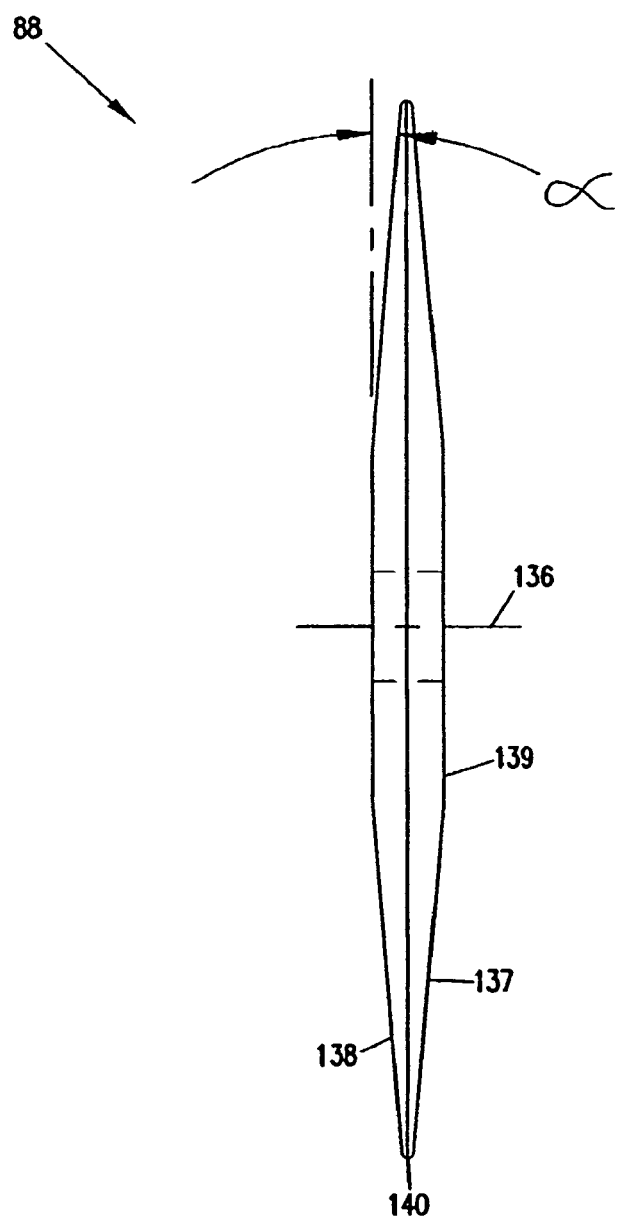
FIG. 16 is a side elevational view of a creaser wheel, i.e., one of the components utilized in a manufacturing approach depicted in FIG. 7.

FIG. 16 illustrates one embodiment of creaser wheel 88 that is optionally used with the process 70. As can be seen in FIG. 7, when used, the creaser wheel 88 is oriented such that its axis of rotation 136 is oriented parallel to the flute direction. This means that the creaser wheel 88 rotates in a plane that is in a direction transverse to the flute length. In reference again to FIG. 16, the creaser wheel 88 depicted is shown with its axis of rotation 136 passing centrally therethrough. The creaser wheel 88 is generally tapered at opposite surfaces 137, 138 from a central region 139 adjacent to the central axis 136 extending to an end region 140. The end region 140 is narrow, when compared to the width across the creaser wheel 88 at central region 139. In the example shown, the end region 140 is less than one-half the width across the creaser wheel 88 at the central region 139. In many embodiments, the width across the end region 140 is less than one-third of the width across the central region 139. In the example embodiment illustrated, the tapered surfaces 137, 138 are tapered at an angle I less than 10°, at least 1°, and in the particular example, 3-6°.

The creaser wheel 88 is optionally used to initially nick the flute 68. In particular, the creaser wheel 88 rotates about the axis 136 in the direction of movement of the corrugated sheet 66. The end region 140 contacts the ridges 80 of the corrugated sheet 66 and presses the ridges 80 in a direction toward the non-corrugated sheet 64. FIGS. 17-19 show a cross-section of the Z-media 74 after contact with the creaser wheel 88. A creaser indent is shown at 142. The ridge 80 can be seen to be pushed toward the non-corrugated sheet 64 after contact with the end region 140 of the creaser wheel 88. In FIG. 19, it can be seen that the indent 142 may, in some instances, form a generally flat portion 144 extending between opposite sides 146, 147 of the flute 68. Thus, in the example shown, the creaser wheel 88 flattens the ridge 80 toward the non-corrugated sheet 64.

In typical preferred application of the techniques described, as the ridge 80 is folded toward the non-corrugated sheet 64, it will also be sealed to the non-corrugated sheet. One approach to accomplishing this sealing is through use of a sealant.

In FIGS. 17-19 an area of sealant 150 is shown. In an example process, a bead of sealant 150 is applied between the non-corrugated sheet 64 and the corrugated sheet 66 upstream of the creaser wheel 88. The indent 142 is placed along a portion of the flute 68 that is above the area of sealant 150. In other words, troughs 82 that are adjacent to the ridge 80 that is put in contact with the creaser wheel 88 are secured to the non-corrugated sheet 64 with the sealant 150.

Figure 20:
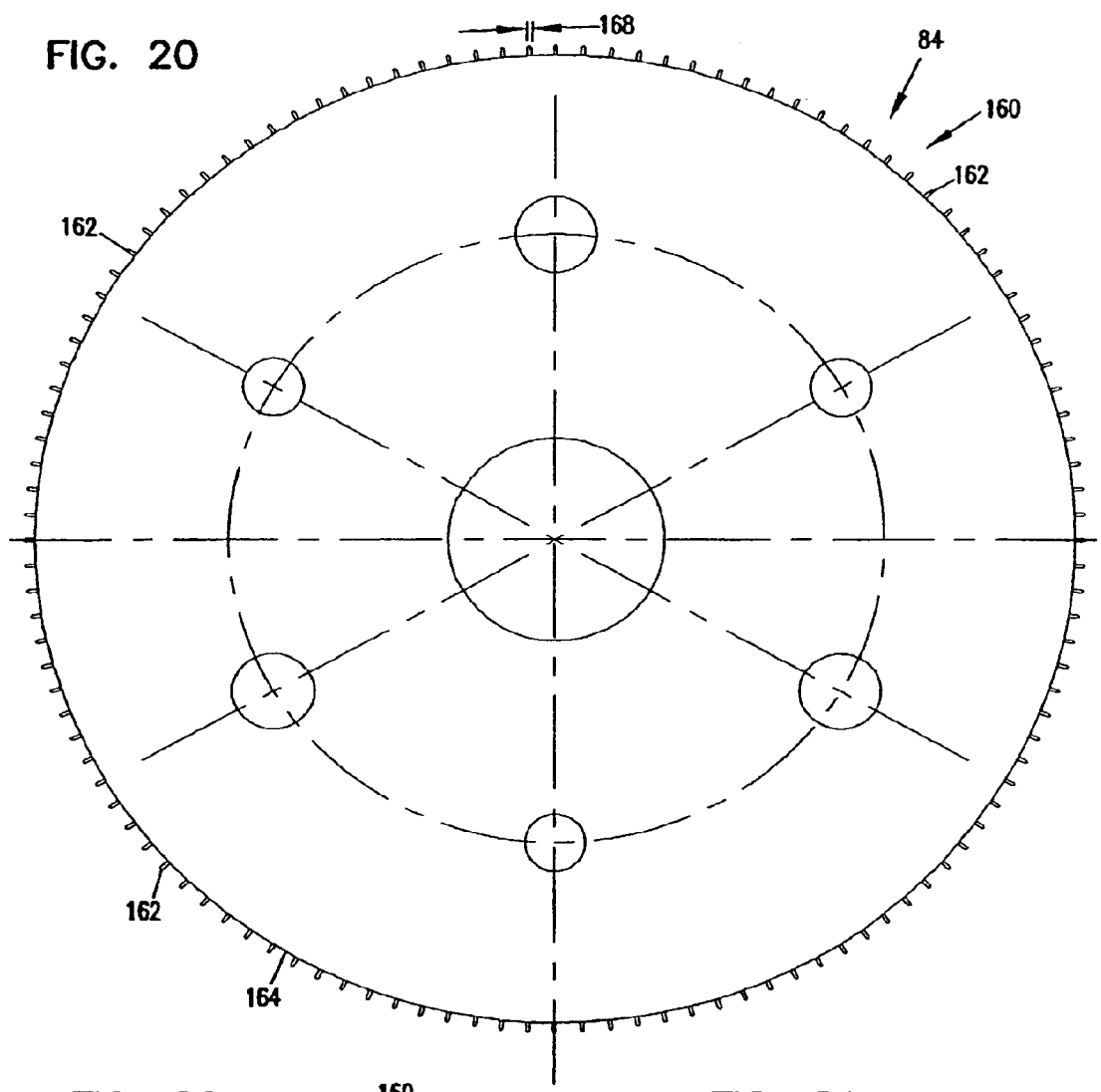
FIG. 20 is a cross-sectional view of a flute inverter wheel of FIG. 7.
Figure 21:
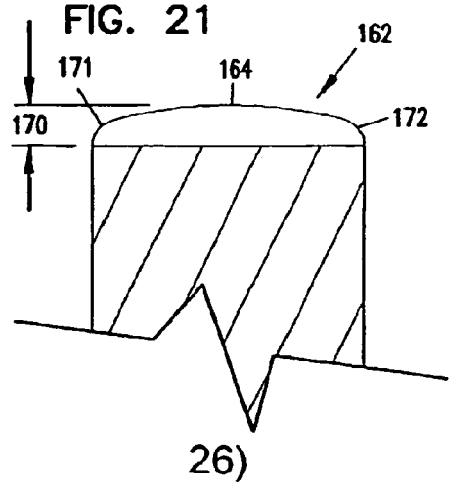
FIG. 21 is an enlarged, partially cross-sectional, view of an end of one of the teeth shown in the flute inverter wheel of FIG. 20.

Attention is next directed to FIGS. 20 and 21. One particular embodiment of an indenting or darting wheel 84 is shown at 160. The darting wheel 160 shown includes a plurality of indentation picks or teeth 162 extending radially from a surface 164 of the wheel 160. In the example embodiment shown, and in reference to FIG. 7, in general, the darting wheel 84 rotates in a direction that is parallel to the flute direction. This means that the darting wheel 84 rotates in a plane that is generally transverse to the direction of the flutes.

Turning again to the example darting wheel 160 depicted in FIG. 20, the teeth 162 are preferably uniformly spaced about the radial surface 164. The teeth 162 are spaced to correspond to the particular geometry of the corrugated sheet 66. That is, the spacing between adjacent ridges 80 of the corrugated sheet 66 is a primary factor in spacing between the adjacent teeth 162. The number of teeth 162 used is also a function of the diameter of the darting wheel 160. In the example shown, the darting wheel 160 includes at least 50, no greater than 200, and typically 100-150 teeth 162. In the specific example shown in FIG. 20, there are 120 teeth 162. In a typical implementation, the darting wheel 160 has a diameter from the tip of one tooth 162 to another tooth 162 of at least 8 inches (20.3 cm), no greater than 12 inches (30.5 cm), typically 9-10 inches (22.9-25.4 cm), and in one example about 9.7 inches (24.6 cm). However, variation from this is possible.

In the embodiment shown, each of the teeth 162 has a crown 164 that is smooth and curved. The rounded shape to the crown 164 helps to deform the flutes 68 without tearing the corrugated sheet 66. The radius of the teeth 162 may often typically be at least 0.005 inch (0.01 cm), no greater than 2.0 inch (5.1 cm), typically 0.75-1.25 inch (1.9-3.2 cm), and preferably about 1.0 inch (2.54 cm). The thickness of each tooth is shown at dimension 168. The dimension 168, for the example shown, is at least 0.01 inch (0.03 cm), no greater than 0.05 inch (0.13 cm), and typically 0.02-0.04 inch (0.05-0.1 cm). The height of each tooth 162 is shown in FIG. 21 at dimension 170. The height 170, in some implementations, is at least 0.05 inch (0.13 cm), no greater than 0.5 inch (1.3 cm), and typically 0.1-0.3 inch (0.25-0.76 cm).

Each tooth 162 has a pair of sides 171, 172, between which the crown 164 extends. The length of the tooth 162 between the sides 170, 171 is at least 0.2 inch (0.5 cm), no greater than 1 inch (2.54 cm), and typically 0.5-0.7 inch (1.3-1.8 cm).

Figure 22:
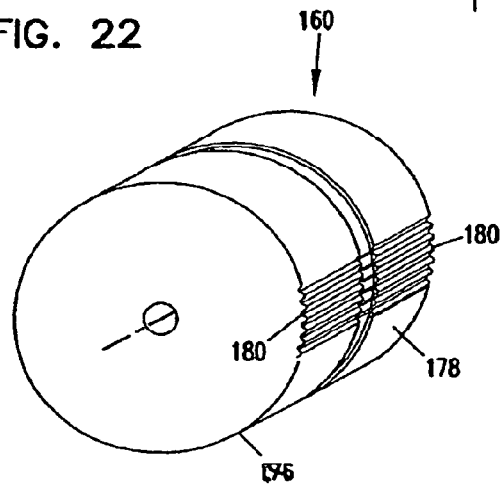
FIG. 22 is a perspective view of the wheel depicted in FIG. 20.

In FIG. 22, the darting wheel 160 is shown located between a pair of fluted rollers 176, 178. The fluted rollers 176, 178 are, in some instances, driven by the movement of the corrugated sheet 66 along the process 70. The fluted rollers 176, 178 help to keep the darting wheel 160 on-center with the flutes 68. As can seen in FIG. 22, the fluted rollers 176, 178 include flutes or corrugations 180 that will mesh with the corrugated sheet 66. FIG. 22 shows the rollers 176, 178 only partially corrugated. It should be understood that, in practice, the rollers 176, 178 are often fully corrugated.

In reference again to FIGS. 8-10, these figures illustrate one of the flutes 68 after engaging the darting wheel 84, for example, the darting wheel 160. In processes wherein the sealant bead 150 is applied upstream of the darting wheel 84, after contact with the darting wheel 84, the ridge 80 forms inversion 110 to extend toward and to touch or engage the sealant bead 150. This helps to hold the inversion 110 and the double peak 116 in place for the folder wheel 86. In FIG. 9, the inversion 110 is shown in engagement with the sealant bead 150 but not in engagement with the non-corrugated sheet 64. In some implementations, the inversion 110 can be pushed fully through the sealant bead 150 into touching engagement with the non-corrugated sheet 64.

Figure 23:
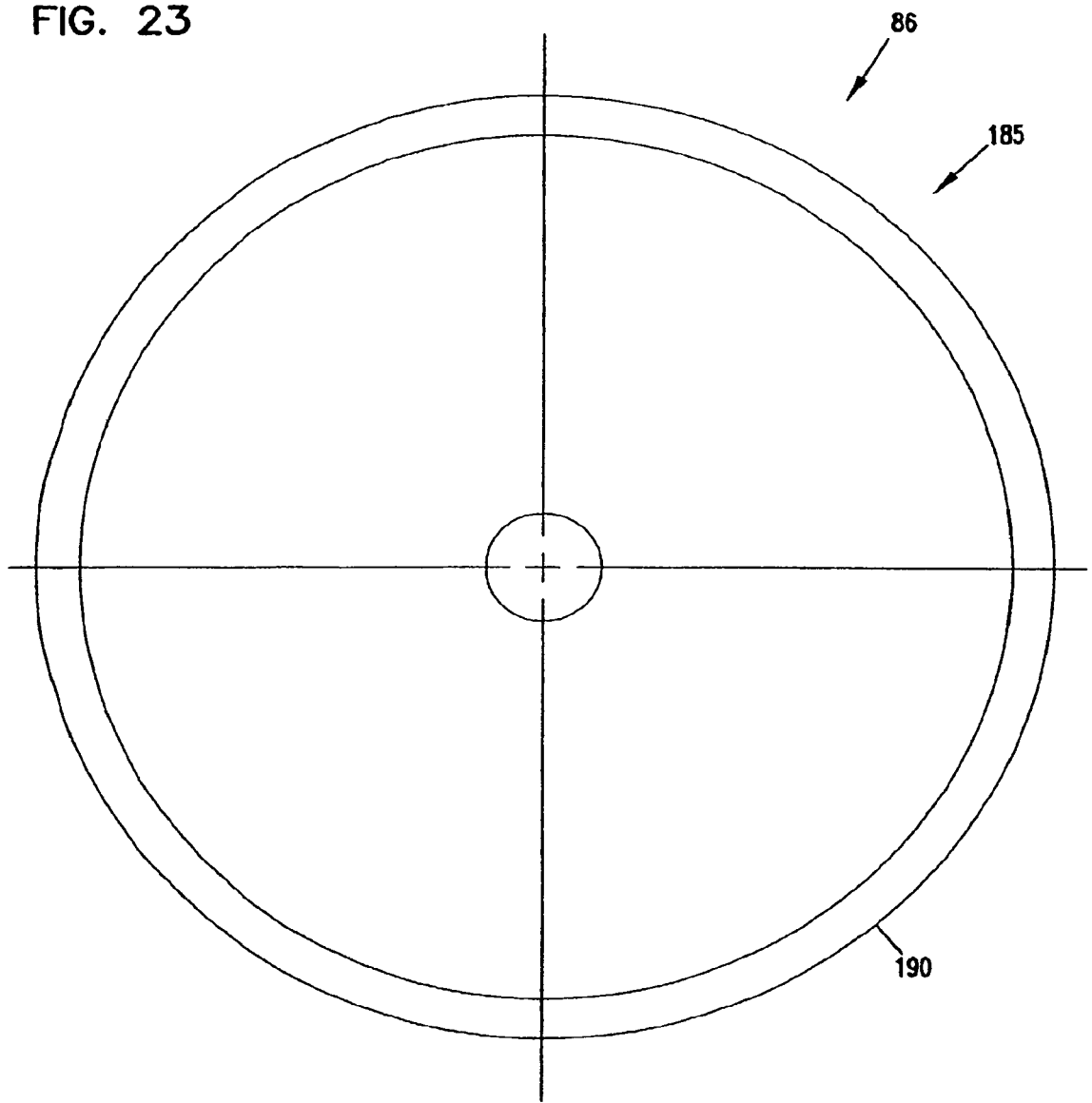
FIG. 23 is a side elevational view of the folder wheel of FIG. 7.
Figure 24:
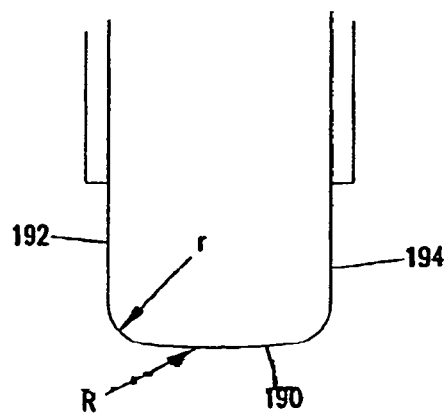
FIG. 24 is an enlarged end view of a portion of the folder wheel of FIG. 23.

FIGS. 23 and 24 illustrate one example of folder wheel 86. The example of the folder wheel 86 in FIGS. 14 and 15 is depicted at 185. The folder wheel 185 functions to press the flute double peak 116 against the non-corrugated media 64 and against the inversion 110 to form darted section 72.

In reference again to FIG. 7, the folder wheel 86 rotates about a central axis 188 that is generally parallel to the direction of the flutes 68. As such, the folding wheel 86 rotates in the same general plane as creaser wheel 88 (if used) and darting wheel 84; that is, folding wheel 86 rotates in a plane that is generally transverse to the direction of the flutes 68.

In reference again to FIGS. 23 and 24, the folder wheel 185 has a smooth, blunt surface 190 for engaging the corrugated sheet 66. The surface 190, in example embodiments, is a toroidal surface on a radius R of at least 1 inch (2.54 cm), no greater than 3 inches (7.6 cm), and typically 1.5-2.5 inches (3.8-6.4 cm).

The folder wheel 185 has opposite axial surfaces 192, 194. The distance between the axial surfaces 192 and 194 generally defines the thickness of the folder wheel 185. In example embodiments, this thickness is at least 0.1 inch (0.25 cm), no greater than 0.5 inch (1.3 cm), and typically 0.2-0.4 inch (0.5-1.0 cm). The diameter of the example folder wheel 185 is at least 3 inches (7.6 cm), no greater than 10 inches (25.4 cm), and typically 5-7 inches (12.7-17.8 cm). The surfaces between each of the axial surfaces 192, 194 and the blunt surface 190 is curved, and in the illustrated embodiment, is on a radius r of at least 0.02 inch (0.05 cm), no greater than 0.25 inch (0.6 cm), and typically 0.08-0.15 inch (0.2-0.4 cm).

C. Example Media Section and Elements

Figure 25:
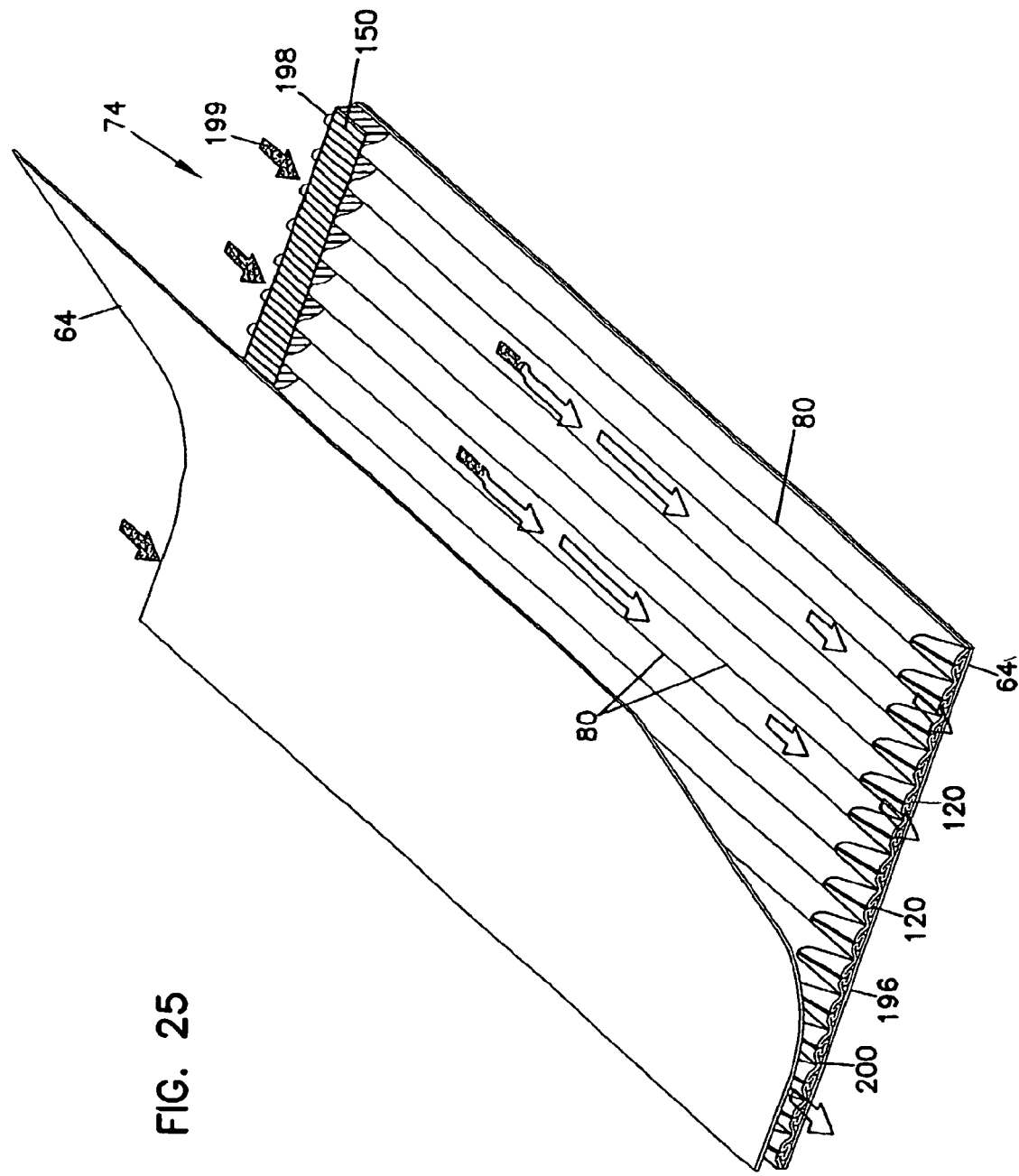
FIG. 25 is a schematic, perspective view of a portion of filter media usable in filter elements of the type shown in FIGS. 26 and 27.

FIG. 25 illustrates a perspective, schematic view of z-media 74 after being modified by indenting and folding to include the darted section 72, and after being separated into pieces 76, 77 by the cutter 90, FIG. 7. The folded flutes 120 can be seen at the downstream edge 196. The air to be cleaned flows in at the upstream edge 198 as shown at arrows 199. The air flows through the Z-media 74 at the upstream edge 198, through the media, and then exits in the region 200 between the darted (folded) flutes 120 and the non-corrugated sheet 64.

Figure 26:
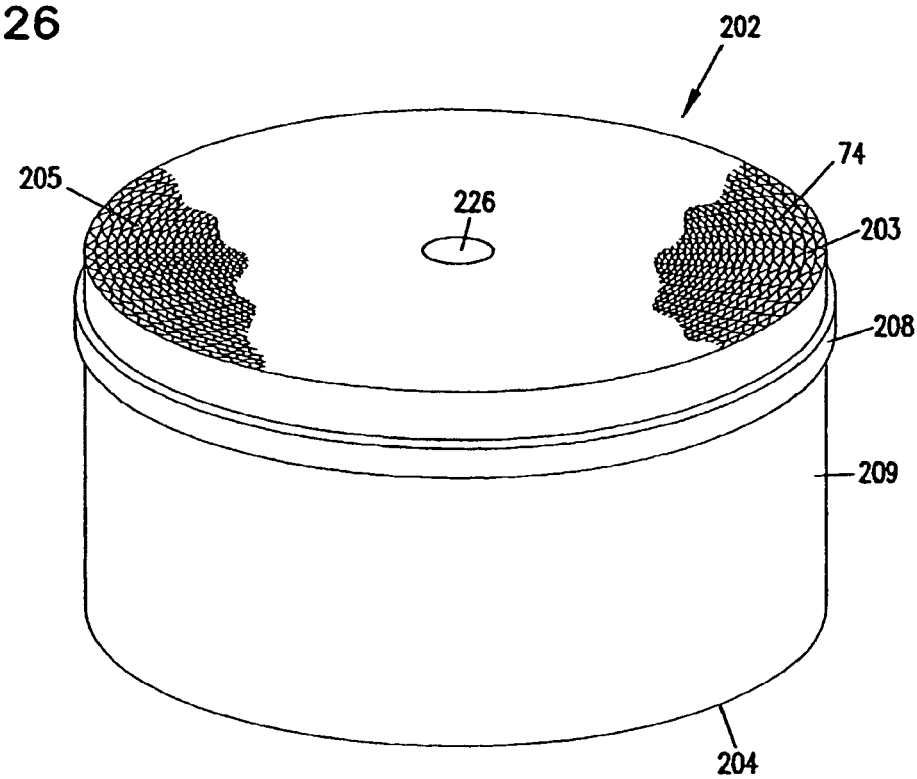
FIG. 26 is a schematic, perspective view of a filter element utilizing fluted filter media having folded ends in accord with the descriptions herein.
Figure 27:
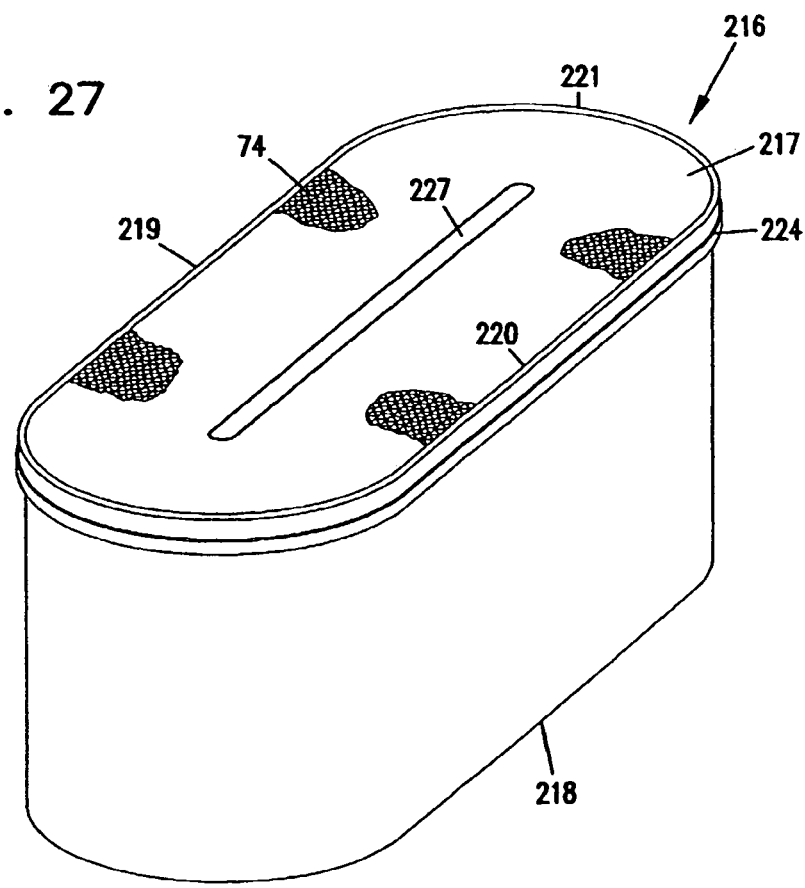
FIG. 27 is a schematic, perspective view of a second filter element utilizing fluted filter media constructed in accord with the principles described herein, and having folded ends.

FIGS. 26 and 27 illustrate example filter elements utilizing Z-media 74 having folded flutes 120. In FIG. 26, the Z-media 74 with the folded flutes 120 is wound into filter element 202. The filter element 202 includes opposite flow faces 203, 204 that, in this instance, are parallel. In alternate configurations, one of the flow faces 203 or 204 may not lie in a single plane, e.g., it may be conical. An example of a conically shaped filter element with z-media is shown in U.S. Des. 399,944; U.S. Des. 428,128; and U.S. Des. 396,098 and z-media with folded flutes can be configured analogously. The flow face 203 is shown schematically, with only portions showing end flutes 205, but it should be understood that the entire filter face 203 will typically have end flutes 205. In use, fluid to be filtered enters the upstream flow face (in this instance 204) and exits downstream flow face, in this instance, 203). The fluid generally flows in the same direction entering the upstream flow face 204 as it exits the downstream flow face 203. Again, this configuration generally referred to herein as a "straight through flow" filter.

As can be seen in FIG. 26, the particular filter element 202 is round, in that it has a circular cross-section. When using the filter element 202 in an air cleaner system, the filter element 202 may be modified by placing an appropriate gasket or other type of sealing members thereon. One example sealing gasket 208 is shown secured to an outer cylindrical surface 209 of the element 202. The sealing gasket 208 shown includes foamed polyurethane and forms a seal with a housing by compression of the gasket 208 against the housing. Examples of usable sealing gaskets include the ones described in U.S. Pat. No. 6,190,432 and U.S. patent application Ser. No. 09/875,844, filed Jun. 6, 2001, and commonly assigned hereto.

FIG. 27 illustrates another example of a filter element 216 utilizing z-media 74 and wound into the filter element 216. As with the filter element 202 shown in FIG. 26, the filter element 216 has opposite flow faces 217, 218 to accommodate straight through gas flow. As with the FIG. 26 embodiment, this embodiment also shows the flow face 217 schematically, with only portions showing end flutes, but it should be understood that the entire filter face 217 typically will show the end flutes. In this embodiment, the filter element 216 is obround. Specifically, this particular filter element 216 has a cross-section in the shape of two parallel sides 219, 220 joined at their ends by curved portions 221, 222. The filter element 216 may include appropriate sealing members or gaskets, and in the example shown, includes the type of sealing member 224 described in U.S. Pat. No. 6,190,432. This sealing member 224 includes polyurethane molded on a frame, secured to the element 216. In each of the elements 202, 216, a central core 226, 227 is shown as having the z-media 74 wound therearound. In some embodiments, the filter elements 202, 216 can be coreless. By "coreless," it is meant that the elements are absent a central mandrel, tube, stick, or other piece that the z-media 74 is wound around.

D. Example System

Figure 27A:
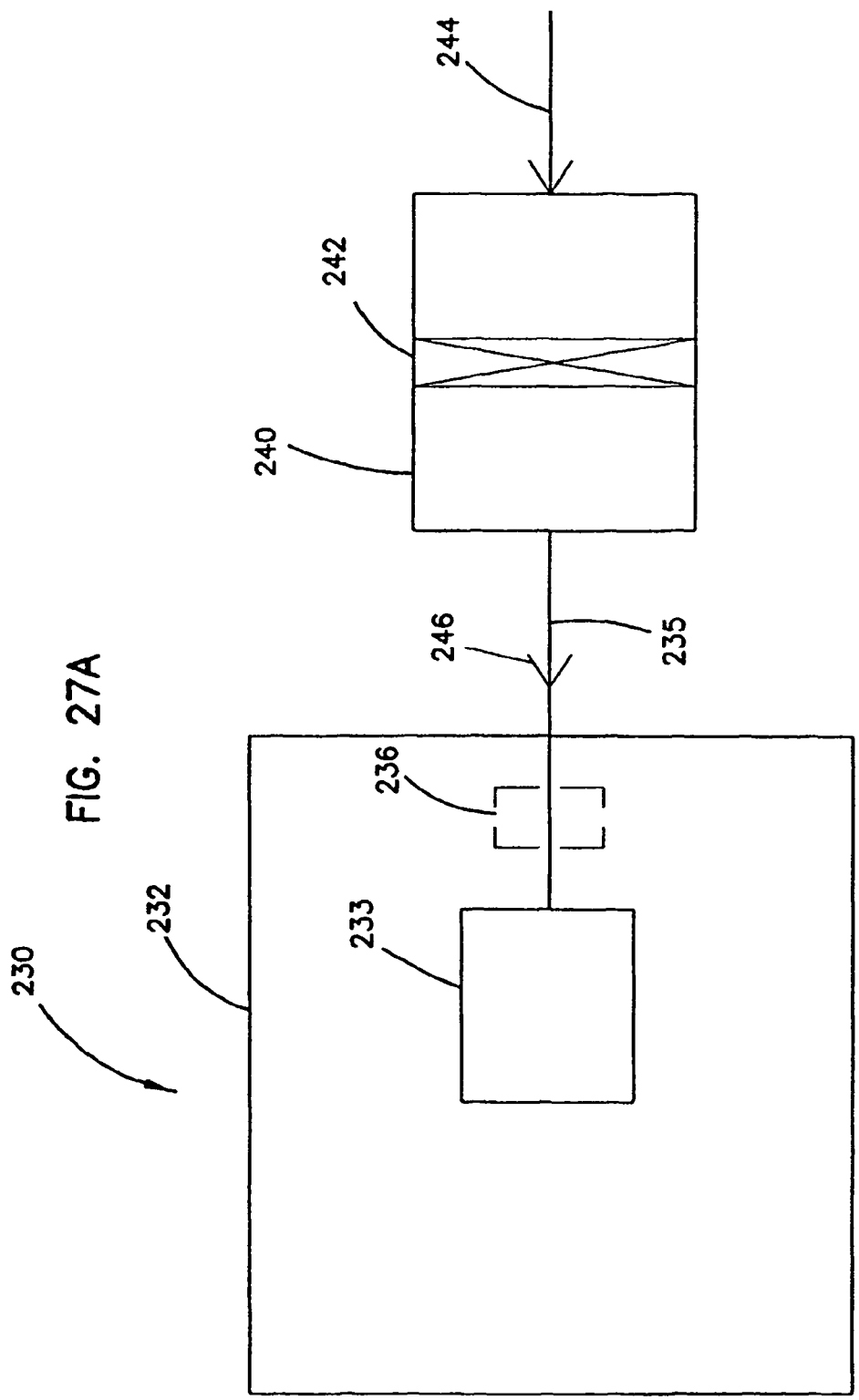
FIG. 27A is a schematic view of one embodiment of a system in which air cleaners having elements for filter media of the type described herein are used.

The filter media described herein can be made into elements, of which examples are shown in FIGS. 26 and 27. The filter elements are useable in fluid (liquid or air) cleaners. One such system is depicted schematically in FIG. 27A generally at 230. In FIG. 27A, equipment 232, such as a vehicle, having an engine 233, with some defined rated air flow demand, for example, at least 300 cfm, for example 500-1200 cfm, is shown schematically. Equipment 232 can include a bus, an over-the-highway truck, an off-road vehicle, a tractor, or marine equipment such as a powerboat. The engine 233 powers the equipment 232, through the use of an air and fuel mixture. In FIG. 27A, the air flow is shown drawn into the engine 232 at an intake region 235. An optional turbo 236 is shown in phantom, as optionally boosting the air intake into the engine 233. An air cleaner 240 having a filter construction 242 is upstream of the engine 232 and the turbo 236. In general, in operation, air is drawn in at arrow 244 into the air cleaner 240 and through the primary element 242. There, particles and contaminants are removed from the air. The cleaned air flows downstream at arrow 246 into the intake 235. From there, the air flows into the engine 233 to power the equipment 232.

Other examples of useable systems include intake air filters gas turbine systems. Of course the media can also be used in liquid (for example oil (lubrication), fuel or hydraulic) filters.

III. Selected Improved Techniques for Generating Folds in Corrugated Media

The techniques described in U.S. provisional application 60/395,009, can be used to form a regularly folded or regular fold pattern, to generate folds, darts or regular gathers at the ends of selected flutes of fluted or corrugated media (especially regular, curved wave pattern corrugated media) in a discontinuous or a continuous process. However with a continuous process, especially as line speed increases, for example at rates from about 30 meters per minute on up, the flexible nature of the corrugated media makes quality control for generation of the regular fold, increasingly difficult. While this in part due to timing issues with respect to the conduct of the deformation step, conducted with the darting or indentation wheel 84, FIG. 7, it is also a function of the flexible nature of the media and a difficulty of ensuring that the indent or dart is not only centered at or near the apex of the corrugation media, but that the corrugation shape itself does not lean in either the upstream or the downstream (machine) direction. Improved techniques that address these issues are described in this section.

A. General Principles

Figure 48:
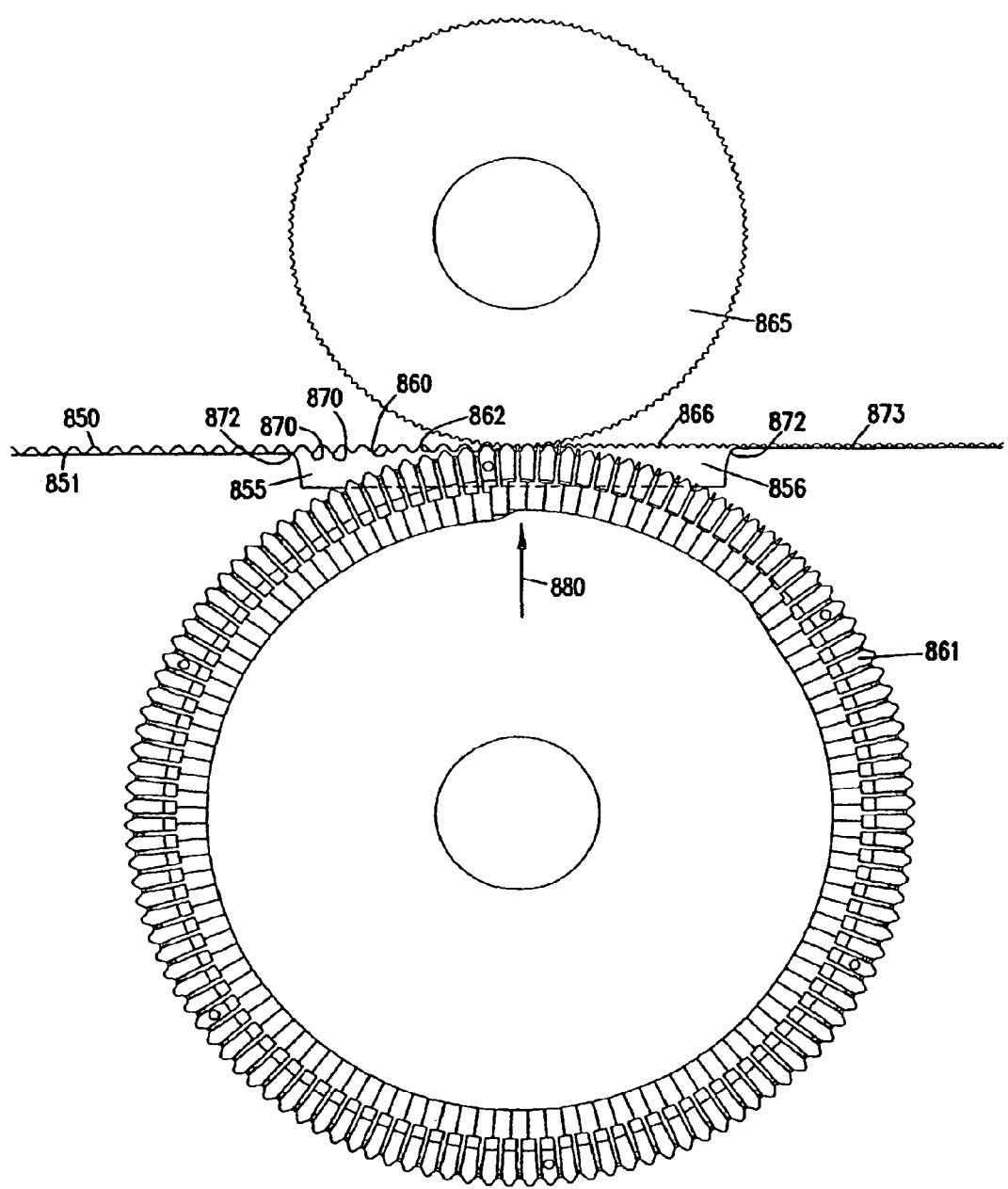
FIG. 48 is a schematic depiction of an alternate edge folding process.

Referring again to FIG. 6, and in particular to corrugation 53, in general surface 53a of a ridge 53, (in this instance directed away from the non-corrugated sheet 44) will sometimes be referred to as the "outside" surface of the ridge 53; and, opposite surface 53b, which is in the trough of corrugation 53 (and in this instance faces sheet 44) will sometimes be referred to as the "inside" surface of the corrugation 53. In general, a folding or darting step for a center darting of the type described above, involves deformation or indentation (in a portion of a ridge 53) directed inwardly; i.e., from the outside surface 53a toward the inside surface 53b. When the corrugated sheet 43 is secured to a noncorrugated sheet 44, the indentation will in many instances be toward flat sheet 44 such that, eventually, a portion of surface 53b engages the flat sheet 44 (or sealant on the flat sheet 44). For example, such an approach was described above to provide the structure of FIG. 15. However, alternatives, for example as described below in connection with FIG. 48 are possible.

For certain of the folding techniques generally characterized herein, a step in the folding process is providing a deformation (in the instance of FIG. 15 an indentation) in outside surface 53a, FIG. 6, by directing a pin arrangement or similar construction against surface 53a in the general direction of arrow 55, FIG. 6. This type of deformation step has generally been referred to as an "indentation step" or "darting step," as explained above in connection with FIG. 7 and wheel or roller 84.

In general, two techniques have been found useful to facilitate generation of a regular fold in corrugated media. These two techniques are:

1. Preferred supporting and containing a flute of the flexible corrugation material, during the deformation process; and
2. Utilization of a moveable (retractable/projectable) tooth or indentation pin arrangement, timed to project outwardly at a selected time and location, to provide a preferred deformation (preferably an indent or initial dart).

A variety of techniques can be utilized to accomplish these preferred processes. For example, containment and support can be provided by supporting the flute or corrugation (during deformation) from: (a) a location outside the corrugation (flute); (b) a location inside the corrugation (flute); or (c) both. The latter approach, in which the corrugation (flute) is supported on both the inside and the outside during the deformation process, will generally be referred to herein as an encapsulation approach, or by variants thereof.

Figure 28:
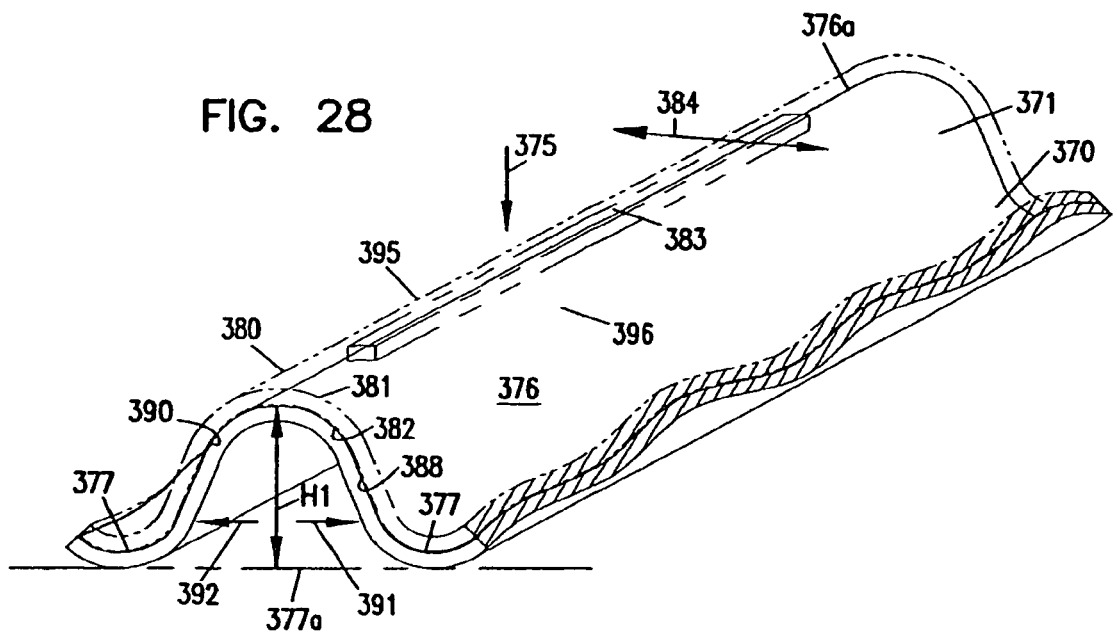
FIG. 28 is a schematic view of corrugated filter media provided with outside support during an indentation process, according to the present disclosure.
Figure 29:
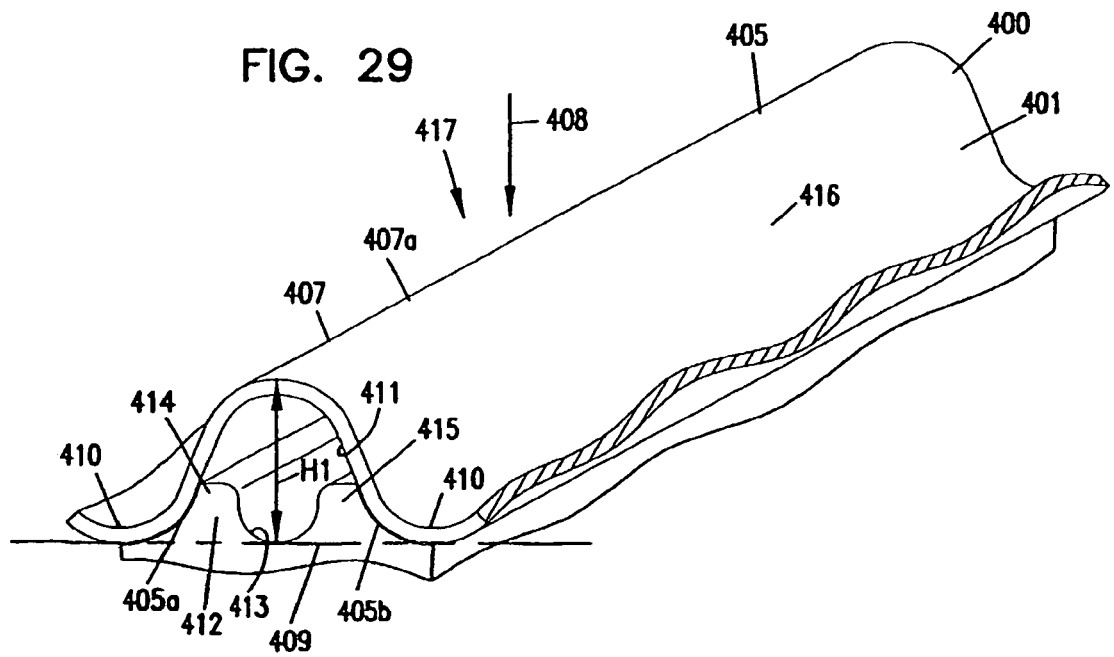
FIG. 29 is a schematic depiction of a corrugation filter media provided with inside support during an indentation process, according to the present disclosure.
Figure 30:
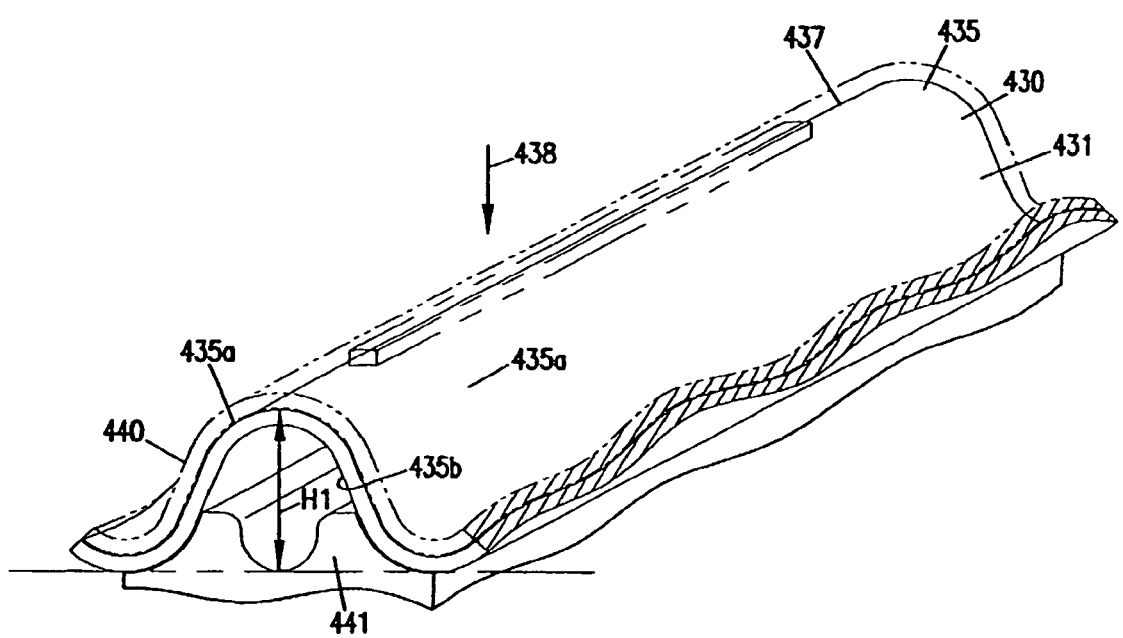
FIG. 30 is a schematic depiction of corrugated media shown supported by an encapsulation process, during the step of indentation according to the present disclosure.

Schematic depictions of examples of each of these three approaches are illustrated in FIGS. 28-30. In FIG. 28, an approach is shown in which the support is provided along a same side (outside) of a corrugation to be folded closed, as a side against which the indenter dart or indentation pin arrangement will press, with the support provided immediately adjacent opposite sides of the indentation pin arrangement. In FIG. 29, an approach is shown in which support is provided on a side (inside) of the corrugation opposite from that against which the indentation pin arrangement will press to start the deformation, again with support provided adjacent opposite sides of the indentation pin arrangement. Finally, in FIG. 30 an encapsulation process is shown, in which support for the corrugation to be folded is provided both inside and outside of the corrugation, in each instance adjacent opposite sides of the indentation pin arrangement.

Herein in the context of the previous paragraph, the term "adjacent opposite sides of the indentation pin arrangement" and variants thereof, is meant to refer to the location of the support relative to where the indentation pin arrangement engages the corrugation to cause inversion. The term is meant to indicate that the support is located longitudinally, along the length of longitudinal extension of the corrugation, at least at the same longitudinal location as the location at which the indentation pin arrangement contacts the corrugation, except offset to the side of the corrugation location (typically ridge) where indentation contact occurs. This will sometimes be referenced as being indenting a corrugation that is supported at a region longitudinally adjacent where indentation will occur. This will be apparent from the detailed descriptions below. In FIG. 28 regions 395,396, indicate this type of support. It is in contrast to the arrangement of FIG. 7, in which there was either no support to the corrugation at all, or any support to the corrugation was located spaced, longitudinally, along the length of the corrugation, away from the darting pin or indentation pin contact location.

Referring to FIG. 28, reference numeral 370 generally indicates the fluted or corrugated media. In the instance of FIG. 28, the corrugated media 370 has a regular, curved, wave pattern for the corrugation 371, with straight flutes. Although the techniques described herein were particularly developed for managing such corrugations, the techniques described herein are not specifically limited to such applications, unless otherwise stated.

In FIG. 28, a particular corrugation 371 to be folded is indicated. In general, the initial folding step is conducted by a deformation or indentation pin arrangement (not shown) applied in the general direction of arrow 375 to an outside or convex side 376 (from the viewpoint of the arrow 375) to form an indent or deformation. For the particular embodiment shown, the deformation pin is directed against the convex side (outside) 376 of the corrugation 371 in such a manner that: the corrugation 371 is first engaged by the pin arrangement at or along an apex 376a; and, such that the indentation force applied by the deformation pin arrangement is generally directed in a direction normal or orthogonal to a plane 377a defined by troughs 377 on opposite sides of apex 376a. It is noted, however, that variations from this, are possible.

Referring still to FIG. 28, corrugation 371 is supported and contained, for the darting process, by form 380. The form 380 is depicted in phantom, in FIG. 28. Form 380 is generally and preferably configured to have a corrugated portion 381 configured to have a surface 382 generally defined as an inverse of the convex or outside surface 371a (of corrugation 371). Thus, the form 380 is preferably configured to mate or mesh with the corrugations of the media. Although a perfect mesh or mate is not required, it will be preferred to have as much engagement as possible, to provide maximum support. The form 380 is preferably rigid, not flexible like the media of the corrugation 371. The form 380, for example, may comprise metal or a hard plastic.

Further, form 380 includes gap 383 therein, through which the darting or indentation pin arrangement can project, in the direction of arrow 375, to engage corrugation 371. Preferably gap 383 is positioned aligned with a portion of ridge 376a.

When it is said that the corrugation is "supported and contained", for the outside darting process, it is meant that during the indentation or darting process, the indentation or darting pin projects adjacent the support so that the corrugation is supported, along its longitudinal length, at the same longitudinal location as the darting occurs, but offset to the side. Corrugation support which occurs immediately on opposite sides of, or adjacent, the indentation pin, as characterized above, would be a specific form of indentation which occurs in a corrugation that is supported and contained for the darting process. In particular, it would be a form in which there is support on both "sides" of the indentation pin, as the indentation pin projects through a gap in the support. The term "sides" in the previous sentence meaning in the directions of double headed arrow 384, FIG. 28, from gap 383.

With the construction shown, when the darting pin arrangement is directed through gap 383 in the direction of arrow 375 against outside surface 371a of corrugation 371 (and when form 380 is present as shown in FIG. 28), the flexible media 370 in the region of corrugation 371 is contained between points 388 and 390, against deformation either in the direction of arrow 391 or in the direction arrow 392. This will help ensure that the flexible corrugated media 370 is contained and does not deform undesirably, during the indentation step. Again, the support is provided, in part, at regions 395,396.

In general, a corrugation will be considered "supported and/or contained" by a support form 380, if either: (a) the form 380 contains the corrugation by contact with the corrugation at or near troughs 377 on opposite sides of the corrugation; or (b) the form 380 extends over the corrugation to cover a distance of the height (H1 of FIG. 6) of the corrugation which is at least 10% of the height (H1); or (c) both. Typically both are used and the extension will be at least 20% of the height (H1), preferably at least 30% of the height (H1), most preferably at least 90% (for example 100%) of the height (H1). That is, if surface 381 of form 380, FIG. 28, extends from apex 376a downwardly toward plane 377a a distance of at least 10% of H1, the corrugation will be considered supported by the form 380. Again, typically the height or extent of support, in the direction of H1, will be at least 90% of H1, typically 100% of H1.

A variety of techniques and configurations can be used to define and provide form 380. A particular approach, usable with continuous manufacturing processes, is described herein below, especially in connection with FIG. 36.

Attention is now directed to FIG. 29. In FIG. 29, a corrugated (fluted) sheet 400 is depicted. Corrugated (fluted) sheet 400 comprises a regular, curved, wave pattern corrugation 401 of straight flutes. In FIG. 29 a particular corrugation or flute 405 is depicted, to be folded in a folding process initiated with an indentation pin arrangement directed toward convex (outside) surface 407, for example at apex 407a, under force in the general direction of arrow 408.

For the particular arrangement shown in FIG. 29, the indentation pin arrangement is directed toward an apex 407a of the convex surface 407, in the direction of arrow 408 with force directed generally normal to, or orthogonal to, a plane 409 defined by troughs 410, on opposite sides of the corrugation 405. Variations from this, however, are possible.

Corrugation 405 is shown supported inside (i.e. along a concave surface 411) by form 412. Form 412 includes a central recessed region 413 therein, to receive a depression or indent in corrugation 405 from the indentation pin arrangement. Form 412 also includes sides 414 and 415 generally defined to conform with a shape of corrugation 405 in regions 405a and 405b, respectively. As with the arrangement in FIG. 28, the form or support 412 of FIG. 29 will generally keep the flexible media 400 centered with respect to an indentation pin arrangement directed thereagainst. The form 412, of course, is preferably constructed from a rigid material.

Herein, a corrugation will be considered supported along the inside as long as the support form along the inside extends, from plane 409 toward apex 407a, at least 10% of the peak height (H1 of FIG. 29). Typically the inside support will extend at least 20%, preferably at least 30%, of H1. A typical example would be 40%-60% of H1.

As with the embodiment of FIG. 28, for the form 412 to be considered to support the corrugation 405, it is not required that the form 412 have an outer surface along sides 414, 415, which has a shape in perfect match to the corrugation shape at these locations. However a configuration as close as possible to a matching shape, is preferred.

Also as with FIG. 28, the support in FIG. 29 is at least is at regions 416, 417, longitudinally adjacent where indentation will occur.

Attention is now directed to FIG. 30. In FIG. 30 an extension of corrugated media 430 is depicted. The corrugated media 430 shown is generally a regular, curved, continuous wave pattern corrugation arrangement 431 with straight flutes. Corrugation 435 is shown positioned for a folding process to be initiated, by an indentation pin arrangement directed against convex surface 437 of corrugation 435 in the direction of arrow 438. In FIG. 30, corrugation 435 is shown encapsulated, between outside or outer form 440, shown in phantom, supporting outside 435a, which generally corresponds to form 380, FIG. 28; and, inner form 441 (against inside surface 435b), which generally corresponds to form 412, FIG. 29. The term "encapsulated" and variants thereof, when used in this context, is meant to refer to a corrugation such as corrugation 435, which is contained along both the convex (outside) and the concave (inside) surfaces, in the vicinity of the indentation pin (preferably on opposite sides of the indentation pin arrangement or darting pin at the same longitudinal location along the length of the corrugation 435) during indentation pin arrangement (or darting pin) projection into the media. Similarly to the embodiments of FIGS. 28 and 29, as a result of the containment, in this particular instance by encapsulation, the corrugation 435 will remain centered and will not undesirably move during the initiation of the folding process.

In an arrangement in which the length D2 (FIG. 6) of the corrugation is approximately 1.2-1.4 times D1, it may be convenient to utilize as the indentation pin arrangement, a single indentation or darting pin directed against the apex of the corrugation, with the pin being on the order of 0.7-0.8 mm thick, and on the order of 5 mm to 40 mm wide. On the other hand, when the length D2 is greater than about 1.4 times D1, it may be desirable to either use a wider indentation pin arrangement, or multiple indentation pin blades, to accomplish the desired indentation step of the folding process.

In many manufacturing applications, it will be preferred to fold the corrugated media after it has been tacked or otherwise secured to the non-corrugated media. In Section II above, an example of darting or folding process was shown, with such a combination, that was conducted at a location spaced from the edges of the media, and located generally centrally along a continuous web of corrugated media attached to non-corrugated media. Such an approach was characterized as mid-web folding and as leading to formation of edge darting, by slitting the resulting folded or darted combination, down the center of the dart. An application of this technique but using outside support for the flutes during indentation is illustrated herein schematically in FIG. 31.

Figure 31:
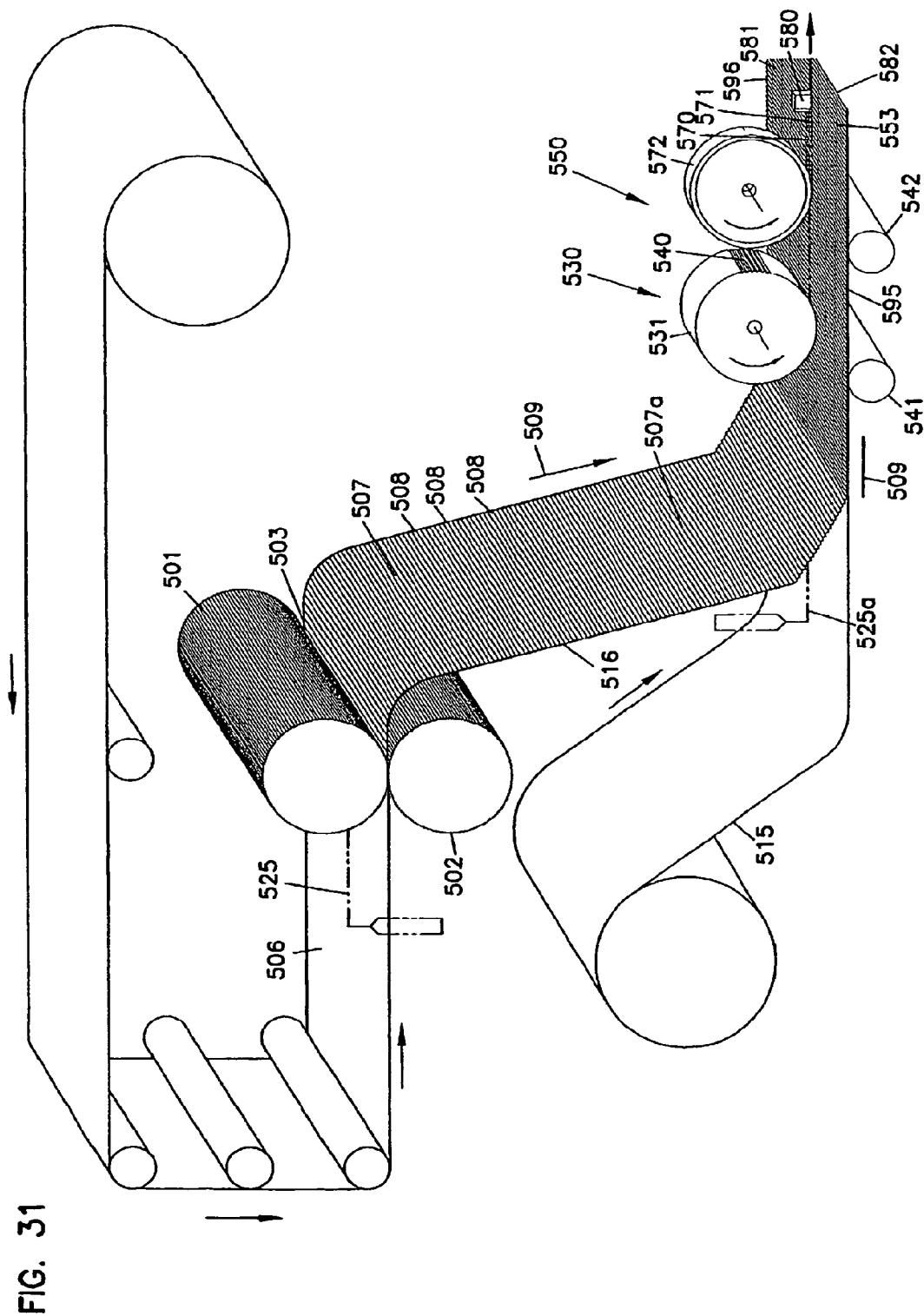
FIG. 31 is a schematic depiction of a process involving supported media, according to the present disclosure.

Referring to FIG. 31, a schematic depiction of a typical manufacturing process is shown. In general, a corrugating station is shown at 500, with two corrugated rollers 501, 502 positioned to form a corrugating bite 503 therebetween. A non-corrugated media sheet 506 is shown directed into the bite 503 to be corrugated with a resulting continuous corrugated web 507 having corrugations 508 thereacross in a direction generally perpendicular to the machine direction 509 being shown. A non-corrugated sheet 515 is shown being brought into engagement with side 516 of corrugated sheet 507. Typically, the two sheets 507, 515 will be tacked to one another at various points there along, to facilitate the manufacturing process. To accomplish this tacking an adhesive, typically a hot melt, can be used. In some instances sonic welding can be used to effect the tacking.

In some applications, an adhesive bead, hot melt, or sealant strip 525 is positioned between the two sheets 507, 515, in a central location. The sealant of the sealant strip is used to ensure a seal, at the location of the fold, in the final product. In the alternative, other sealing techniques such as sonic welds may be useable. The sealant strip 525 can be applied to continuous sheet 506, before it is corrugated on side 516. If it is applied to continuous sheet 506, before it is corrugated, in general the relevant surface portion of one of the corrugating rollers 501, 502 would preferably have a gap therein to accommodate the sealant bead. In the instance of FIG. 31, the gap (not viewable) would be in roller 502. An advantage to this approach would be that the sealant bead will follow the corrugations 508 in the corrugated material. As a result, the sealant will be more appropriately located inside of the folds or creases, after processing. This means that a relatively secure closed fold will result, with less sealant used, than would typically be required for an approach in which sealant is first applied to the non-corrugated sheet, for example as shown optionally at 525a, before the non-corrugated sheet and the corrugated sheet are brought together.

In a step (shown at indentation station 530) a deformation (or indentation or darting) pin arrangement, in this instance comprising a wheel 531, is directed into the convex side of each corrugation 508 on side 507a of corrugated sheet 507. At this location, an upper form 540 for supporting (outside support) of each corrugation during the indentation process is provided. Support to the webs 507 and 515 underneath, is provided by rollers 541, 542.

In the machine direction, media web next proceeds to a pressing/folding station 550, at which sides resulting from the initial indentation process are folded over toward one another, to form the four crease fold shown in FIG. 15. At pressing/folding station 550, a press is used (to cause a center folded strip section 570), which will make a press strip that is at least 1 mm wide, typically 4 mm to 40 mm wide in the resulting media construction 571. The pressing station 550 can comprise a wheel 572, with a cross-section generally analogous to that shown for wheel 185, FIGS. 23 and 24, except dimensioned in width to cause a press width as indicated above. At cutting station 580, the media 571 is shown slit down strip 570. This will result in two extensions 581, 582 of media 583, each of which has an end respectively terminating in folds, for each convex flute (relative to the flat sheet) with ends similar to end or fold arrangement 118, FIG. 15.

Of course, folded flutes could be made at an edge (for example one or more of edges 595, 596), instead of along a center portion of the corrugated media, using a similar approach. In this latter instance, no final step of slitting would necessarily be required, unless trimming was considered preferable to remove excess sealant or media.

In some instances, it may be possible to apply the initial indentation pressure asymmetrically to the corrugation, i.e., not directed against an apex to cause a symmetrical fold.

In general, when it is desired to apply a mid-web folding process (to fold corrugated media that is already secured to non-corrugated media), by an initial indentation or darting pin projection against an exposed convex surface of an individual corrugation and toward a non-corrugated media, an outer support approach (analogous to FIG. 28) will be preferred. This is because it would be difficult to provide corrugation support along an inner surface, between the flat sheet and the corrugated sheet, especially along a center portion of a corrugated sheet/flat sheet combination.

B. An Approach to Supported Indentation with an Outer Support; FIGS. 32-40

Figure 32:
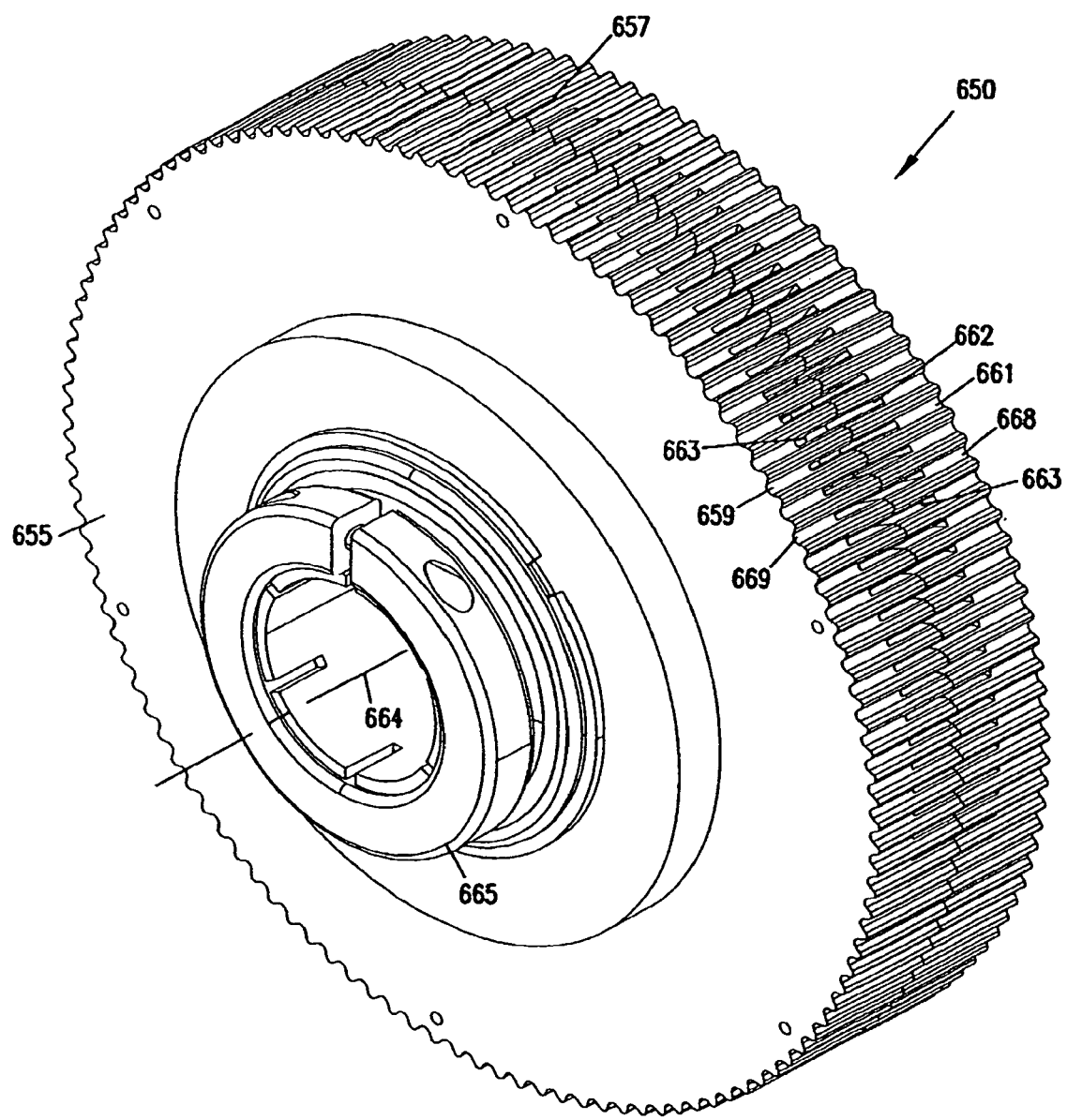
FIG. 32 is a perspective view of a outside support/indentation roller according to the present disclosure.
Figure 33:
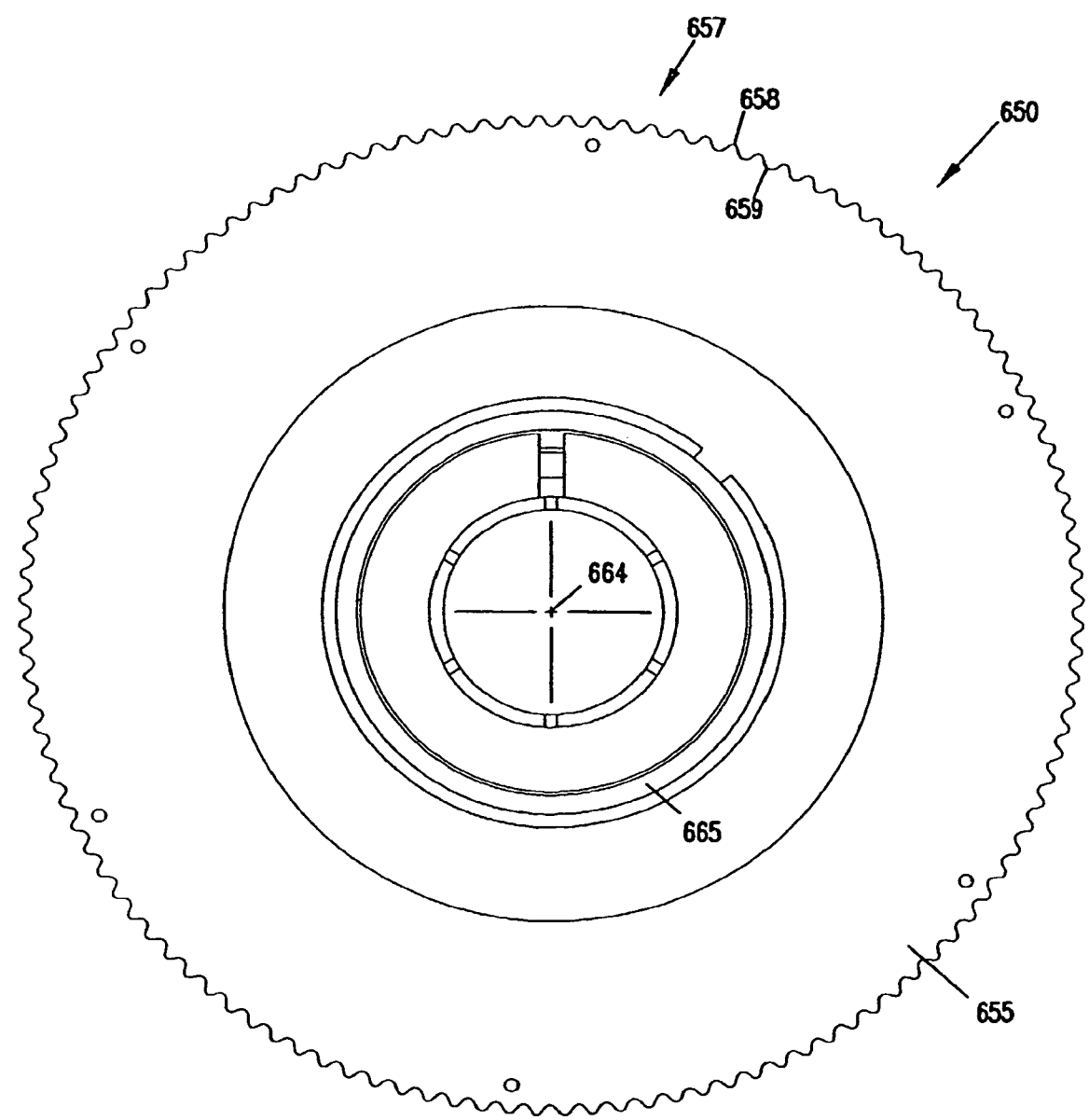
FIG. 33 is a side view of the roller depicted in FIG. 32.
Figure 34:
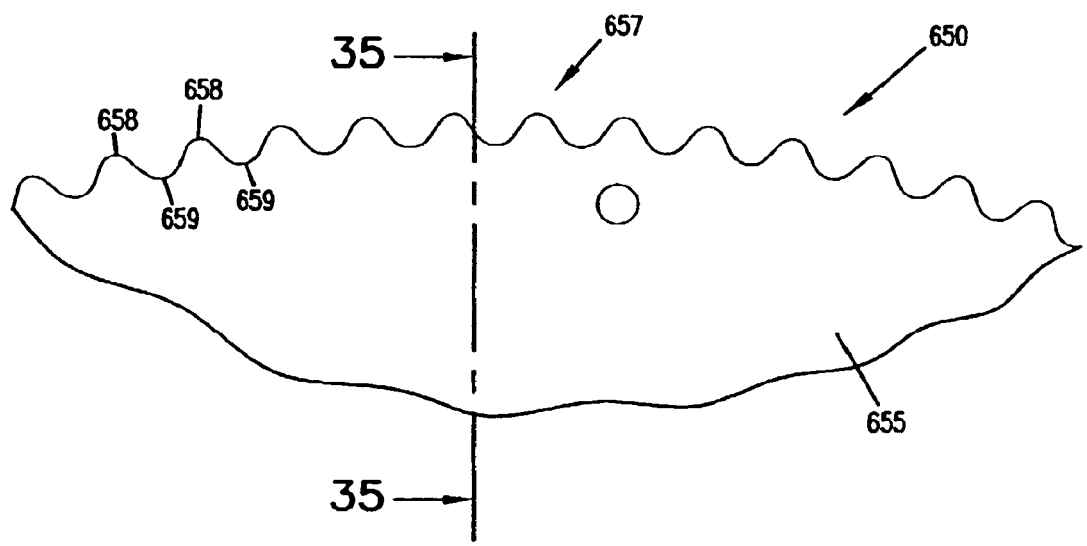
FIG. 34 is an enlarged view of a portion of the roller depicted in FIG. 33.
Figure 35:
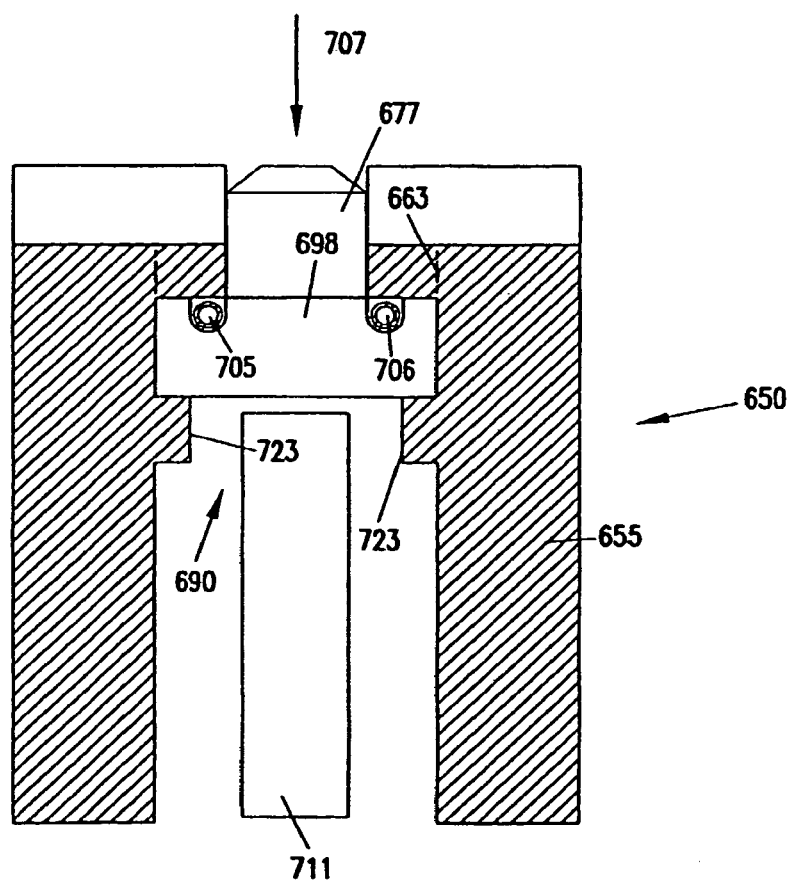
FIG. 35 is a schematic partially cross-sectional view of an outside support indentation roller taken generally from the view point of line 35-35, FIG. 34.
Figure 36:
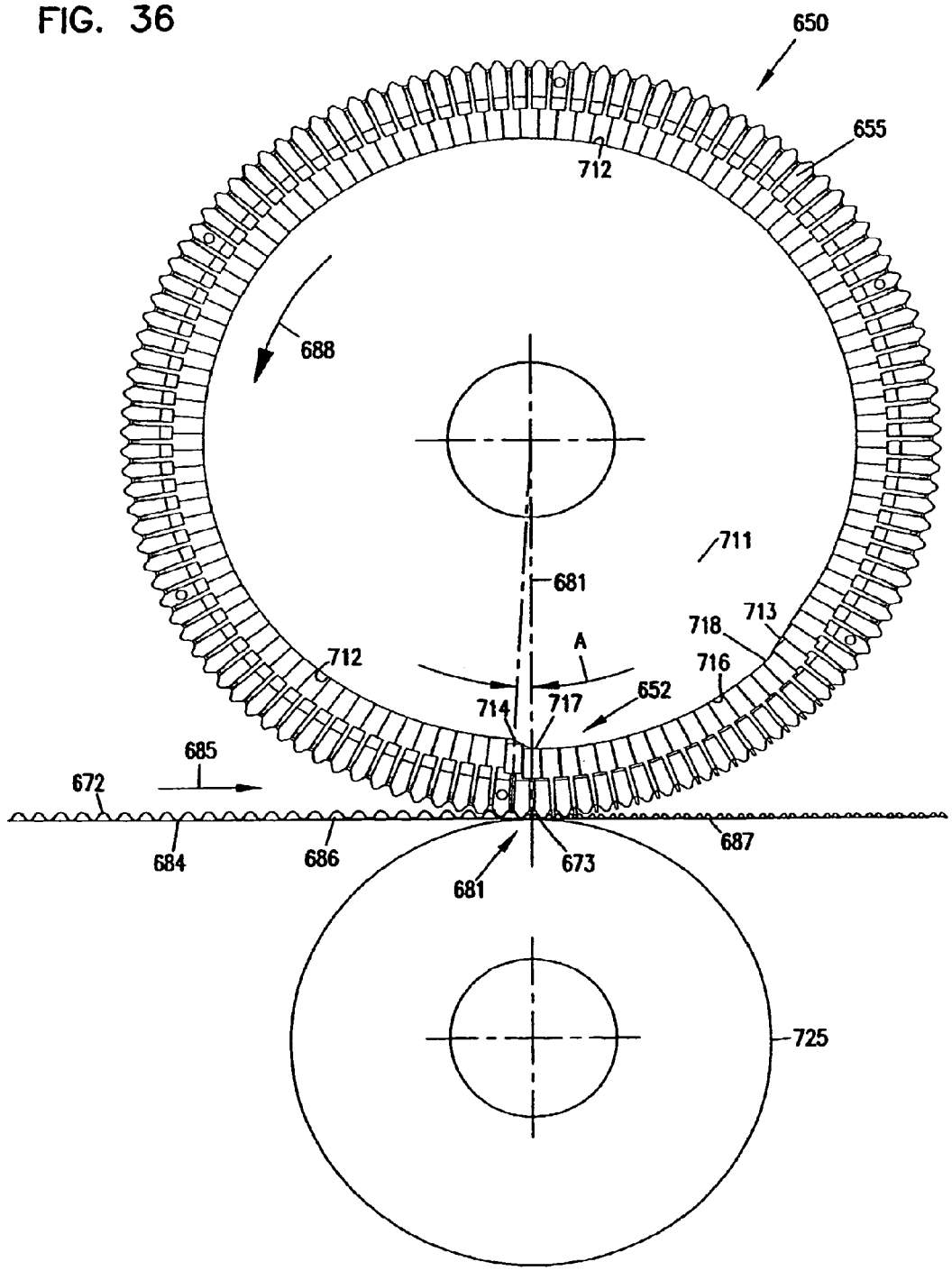
FIG. 36 is a schematic depiction of an outside supported darting process using the roller of FIGS. 32-35.
Figure 36A:
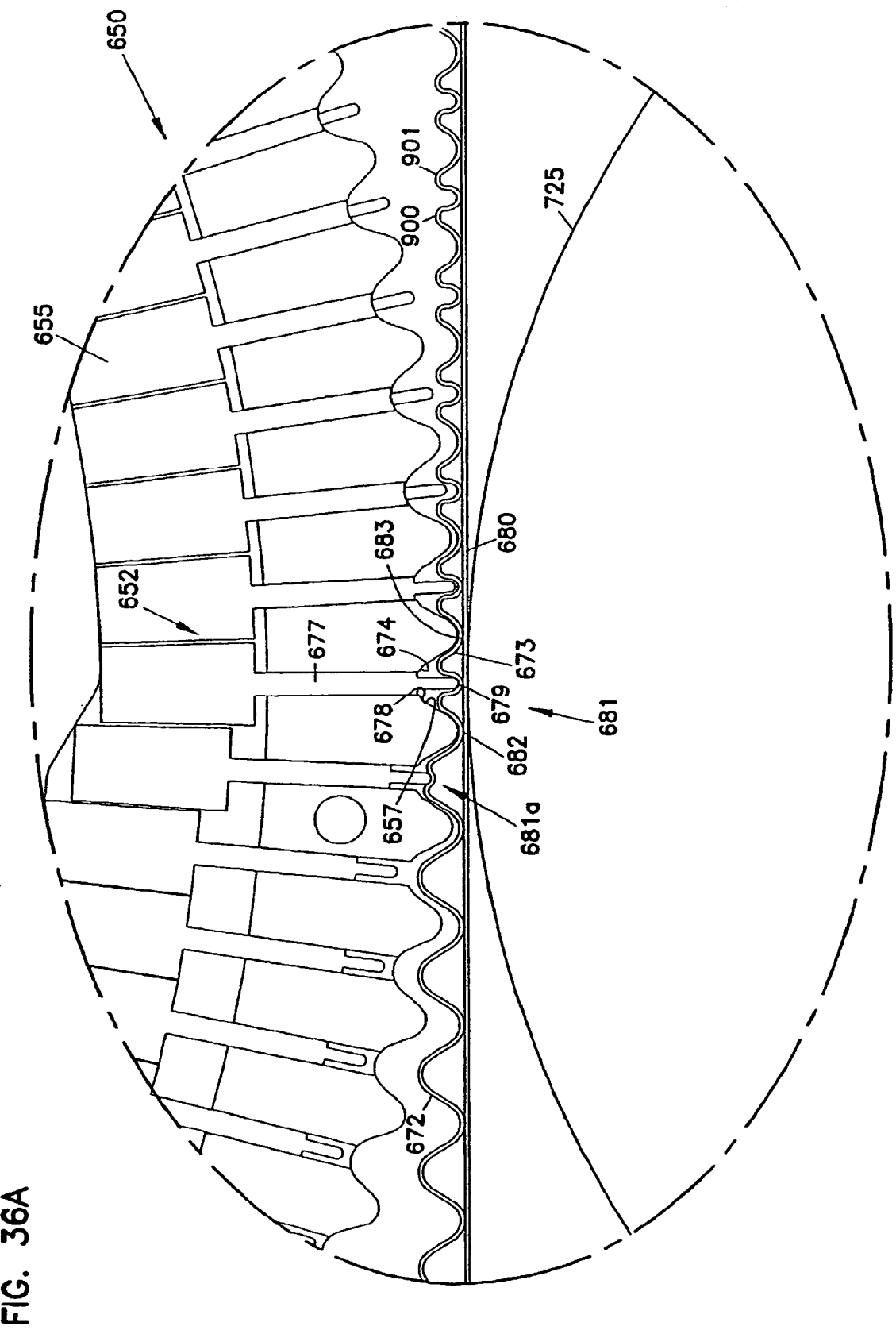
FIG. 36A is an enlarged fragmentary view of a portion of the process depicted in FIG. 36.
Figure 37:
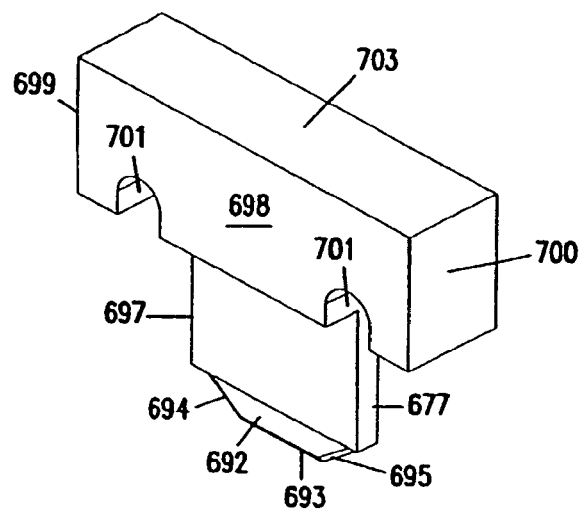
FIG. 37 is a schematic, perspective, view of an indentation pin arrangement utilized in the supporting/indentation roller of FIG. 32.
Figure 38:
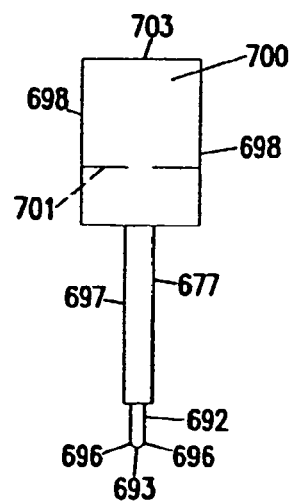
FIG. 38 is an end view of the indentation pin arrangement depicted in FIG. 37.
Figure 39:
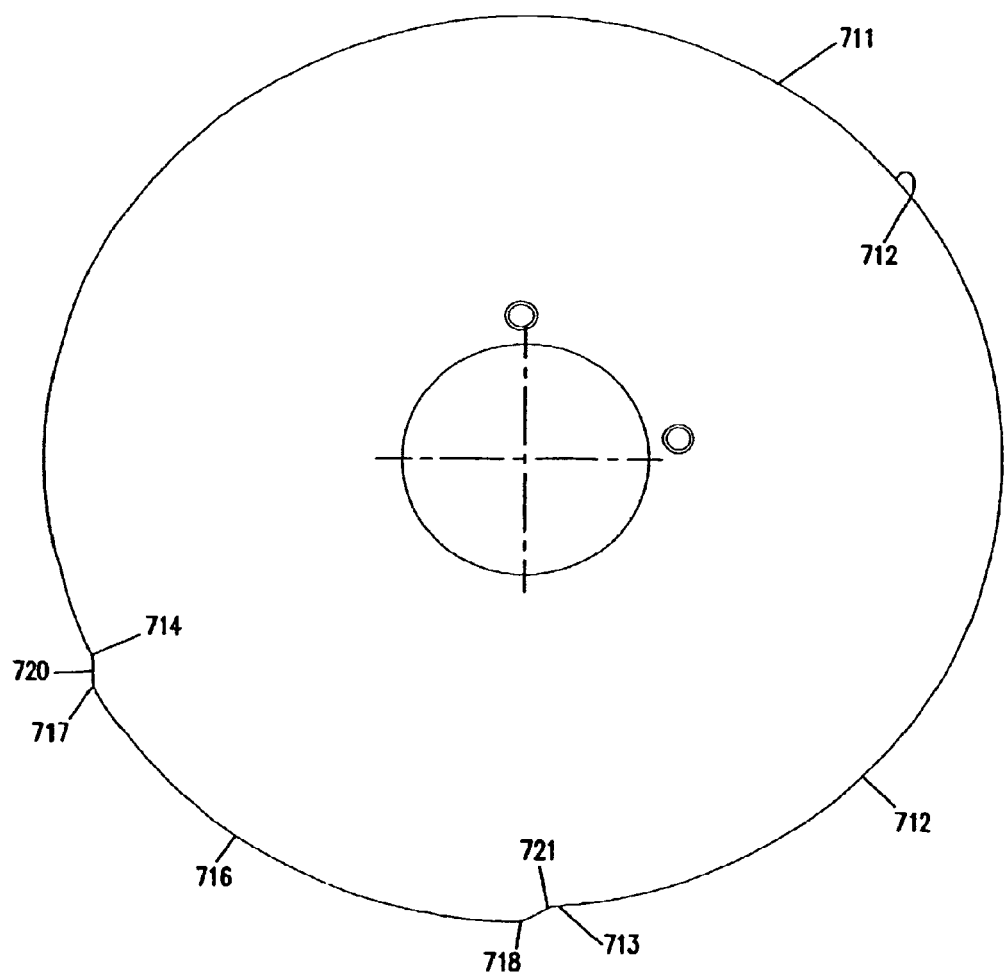
FIG. 39 is a side view of a stationary cam wheel used in the outside support/indentation roller of FIG. 32.
Figure 40:
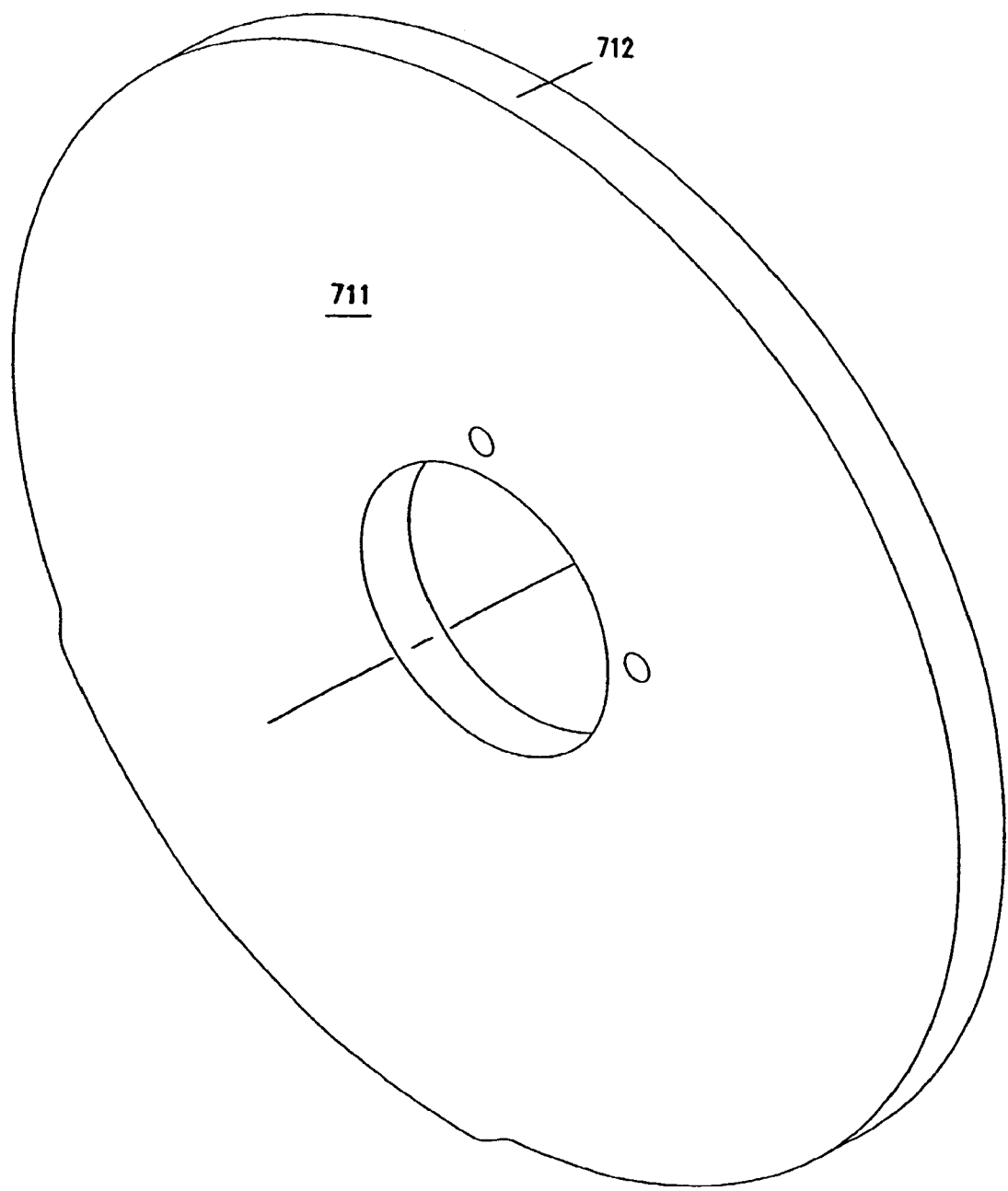
FIG. 40 is a perspective view of the stationary cam depicted in FIG. 39.

Outside support to a corrugation, during an indentation step, can be provided in practice, by a variety of arrangements. In FIG. 32-40, a support arrangement is shown, which utilizes a rotating roller or wheel. In FIG. 32, the roller or wheel is indicated generally at reference numeral 650, in perspective view. In FIG. 33, the roller wheel 650 is shown in side elevational view. In FIG. 34, a portion of roller or wheel 650 is shown in enlarged view. FIG. 35 is a fragmented, schematic, cross-section of roller or wheel 650, taken generally along line 35-35, FIG. 34. In FIG. 36 a schematic view showing an indentation step, using an indentation pin arrangement 652 is shown. In FIG. 36a, an enlarged portion of FIG. 36 is depicted. In FIGS. 37 and 38, a darting or indentation pin projection is shown. In FIGS. 39-40, an internal cam component is shown.

Referring first to FIG. 32, wheel 650 is an outside support wheel 655 for corrugations, during an indentation step of a corrugation folding process. In addition, wheel 650 includes a projectable/retractable indentation pin arrangement 652, not viewable in FIG. 32, to provide for an initial indentation step into a corrugation, during a portion of a folding process. This will be discussed below, in connection with the descriptions of FIGS. 36 and 36a.

Still referring to FIG. 32, in general the wheel 650 includes an outer, annular, corrugation engagement surface 657, depicted enlarged in FIG. 34. Referring to FIG. 34, the outer corrugation engagement surface 657 comprises a plurality of alternating ridges 658 and troughs 659 sized and configured, to engage an outside surface of a corrugated material. Preferably the ridges 658 and troughs 659 are configured to define a regular, curved, wave pattern of straight ridges and troughs, corresponding to the corrugation pattern of the media to be folded, except surface 657 is positioned around the outside of a wheel 650, and thus the corrugations 658 and troughs 659 have a slight radius to their extension, not present in the corrugated media when the media is flattened out, as shown in FIG. 31.

Referring to FIG. 32, a bottom 661 of each trough 659 includes, in a central portion 662 thereof, a slot 663. The slot 663 is sized and positioned so that an indentation pin arrangement 652, not shown in FIG. 32, can selectively be projected through the slot 663, in a direction away from a center axis 664 of the wheel 650 (or toward media), to cause an indentation in a selected, supported, corrugation during use. (Also the indentation pin arrangement 652 can be retracted through slot 663 toward axis 664.)

Still referring to FIG. 32, for the particular embodiment shown, the wheel 650 is mounted on a rotation bearing 665. Preferably the wheel 650 is mounted such that its rotation will be driven by the corrugated media in use. That is, preferably wheel 650 is not driven during use, except through engagement with the corrugated media to be folded, FIG. 31.

Still referring to FIG. 32, preferably each ridge 658 and trough 659 has an end extension 668, 669 at opposite ends of each slot 663 of sufficient length, to support the corrugation to be deformed at opposite ends of the slot 663, during an indentation process. Preferably the length of each extension 668, 669 is at least 6 mm., and typically at least 12 mm. Typically, each slot 663 will have a length of at least 6 mm., typically at least 12 mm.; and a width of at least 0.5 mm., typically at least 0.7 mm.

In general, the indentation pin arrangement 652 will include a pin projection/retraction mechanism constructed and arranged to selectively drive or project an indentation or darting pin arrangements through one of slots 663 against or into an engaged corrugation to be folded, and to selectively retract an indentation pin arrangement when appropriate. This process can be understood, by consideration of the embodiment depicted in FIGS. 36-40.

Referring to FIG. 36, wheel 650 is shown schematically, in engagement with corrugated media 672. In particular, corrugation 673 is shown supported by trough 674 of wheel 650; see fragmentary enlargement FIG. 36A. Trough 674 is a particular one of the troughs 659 and thus includes a slot corresponding to slot 663, FIG. 32, in a central portion thereof.

Referring to FIG. 36A, indentation pin arrangement 677 is shown driven through slot 678 in a radially outward direction from surface 657, and axis 664 (FIG. 36), into supported corrugation 673. As a result, an indentation corresponding to the indentation shown in FIG. 9, in cross-section, is initiated. (It is noted than in FIGS. 9 and 36A, the indentation is shown to be sufficiently long (or deep) to cause the indent 679 to connect the non-corrugated sheet 680. While this is preferred, it is not required in all applications.)

The indentation pin arrangement 652, including indentation pin 677, is preferably arranged such that projection of the pin 677 outwardly through slot 663, FIG. 36A, is: (a) at its maximum extent of projection at indentation formation position 681; i.e., when the pin 677 is approximately orthogonal to a plane defined by sheet 680 or as generally defined by troughs 682, 683 on opposite sides of the corrugation 673; and (b) so that the pin 677 is completely retracted out of engagement with the corrugation 673 when the media is not supported, for example at a rotation angle A (FIG. 36) of no more than 2 times (2×) the pitch in the upstream direction, preferably no more than 1 time (1×) the pitch in the upstream direction. In this context, reference to the "upstream direction", is meant to a direction from which the web 684 is fed into the roller 650. In the instance of FIG. 36, the web generally moves in the direction of arrow 685. Thus, the upstream side is indicated at 686 and the downstream side is indicated at 687, for the web 684. The rotation angle A would be defined as an angle extending clockwise from the center line or indentation formation position 681. It is noted that for the arrangement shown in FIG. 36, during operation roller 650 would rotate counterclockwise, i.e. in the general direction of arrow 688. Of course the process could be configured for a reverse rotation and machine direction.

It is generally preferred that the pin arrangement 652 (FIG. 36A) be under projection movement radially outwardly when it engages the apex of an engaged corrugation plane. This is facilitated by relatively small angle A, since a small angle A helps to provide that the pin is actually being forced radially outwardly from axis 664, toward and into engagement with the corrugation 673, while the corrugation 673 is supported. This is shown at locations 681 and 681a, in FIG. 36A.

A variety of arrangements can be used to project and retract the indentation pin 677. A particular pin projection/retraction arrangement 690 is depicted in FIGS. 35-40. It uses a plurality of spring loaded pins 677, one associated with each slot 663. Referring to FIGS. 37 and 38 a pin 677 is shown in its entirety. The pin 677 includes a projection portion 692, which is configured to pass through slot 674 with tip 693 directed toward a corrugation, in use. The projection portion 692 (FIG. 37) includes beveled ends 694, 695, for a preferred indentation or deformation. Edge 696 (FIG. 38) can be rounded or beveled, to facilitate indentation without damage to the media.

The tip 693 is mounted on projection support 697, in extension outward from base 698. The base 698 extends between end portions 699, 700, with each end 699, 700 including a spring receiving trough 701 therein.

Base 698 includes, opposite projection support 697, a surface 703 for use, as described below.

Referring to FIG. 35, a schematic depiction, an individual pin 677 is shown mounted by first and second circular springs 705, 706, to be biased in the direction of arrow 707 within wheel 650. As a result, each pin 677 will rotate with wheel 650 around bearing 665, FIG. 32, in line with (and in coordination with) its associated slot 663.

In order to project selected pins 677 outwardly through slots 663, at the appropriate time, the wheel 650 is mounted to rotate around a stationary, circular cam 711, FIG. 35. By the term "stationary" in this context, it is meant that the cam 711 does not rotate with wheel 650 in use.

Referring to FIG. 39, outer annular surface 712 of cam 711, includes a portion 712 which extends (counterclockwise in FIG. 39) between points 713 and 714 of circular, stationary, cam 711 and is appropriately recessed, relative to the wheel 650, such that pins 677 passing there over, are completely retracted. On the other hand, surface portion 716 in extension counterclockwise between points 717 and 718 operates as a cam surface which, when engaged by surface 703 of each pin 677, will force the pin 677 to project outwardly through slot 663, an appropriate extent to cause desired indentation, usually an extent of projection on the order of 50%-100% of the flute height.

Referring to FIG. 39, movement of the pin 677 (FIG. 36) from a most retracted position to a most projecting position, occurs the pin engages cam ramp 720. The cam ramp 720 is preferably configured to cause an amount of projection of an associated pin outwardly of at least 50%-100% of the flute height over a preferred rotation angle (angle A) as previously described for 36. The reason for this is that it causes a substantial projection effect of the pin, against an associated corrugation in a web, during indenting or darting while the corrugation is supported.

Cam ramp 721 allows for pin retraction.

It is noted that in the schemation of FIG. 35, the slot 663 behind regions 722 of wheel 650, into which the base 698 of pin 677 will move, during projection, is not viewable. Also, typically springs 705, 706 are continuous and all pins 677 are mounted on the same pair of springs 705, 706 to be biased against shelves 723 in wheel 650 until cam ramp 720 (FIG. 39) on cam wheel 711 is reached.

In FIG. 36 a smooth roller 725, for back up support to pressure exerted n web 684 by roller 650, is shown.

C. An Approach to Supported Indentation within an Inner Support; FIGS. 41-45

Figure 41:
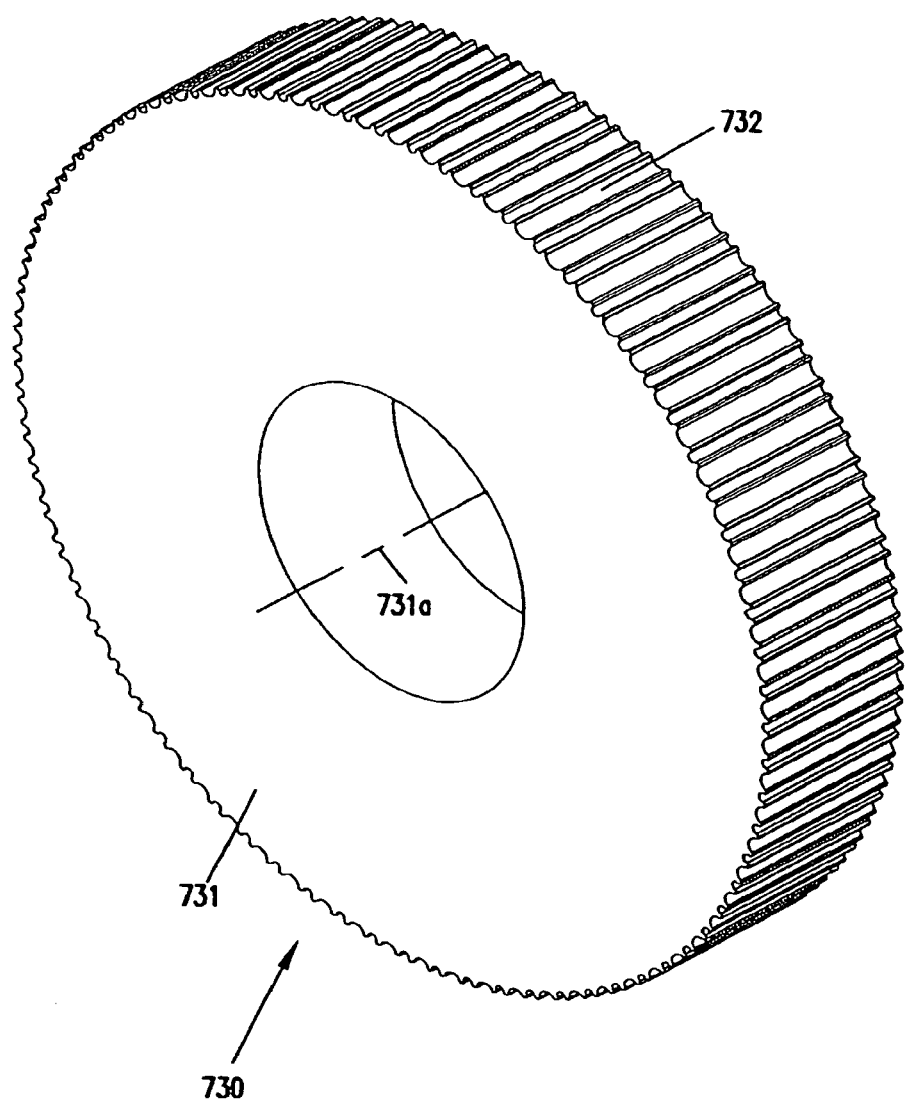
FIG. 41 is a perspective view of an inside support roller.

Attention is now directed to FIGS. 41-45, in which an arrangement for providing inside support to a corrugation, during an indentation process, is shown. Referring to FIG. 41, an inside support 730 is depicted. Inside support 730, generally comprises a rotatable roller or wheel 731 (or receiver roller or wheel), mounted to rotate around axis 731a, on a bearing, not shown. The wheel 731 has an outer annular surface 732 configured to provide support to the inside of a corrugation, during an indentation process.

Figure 42:
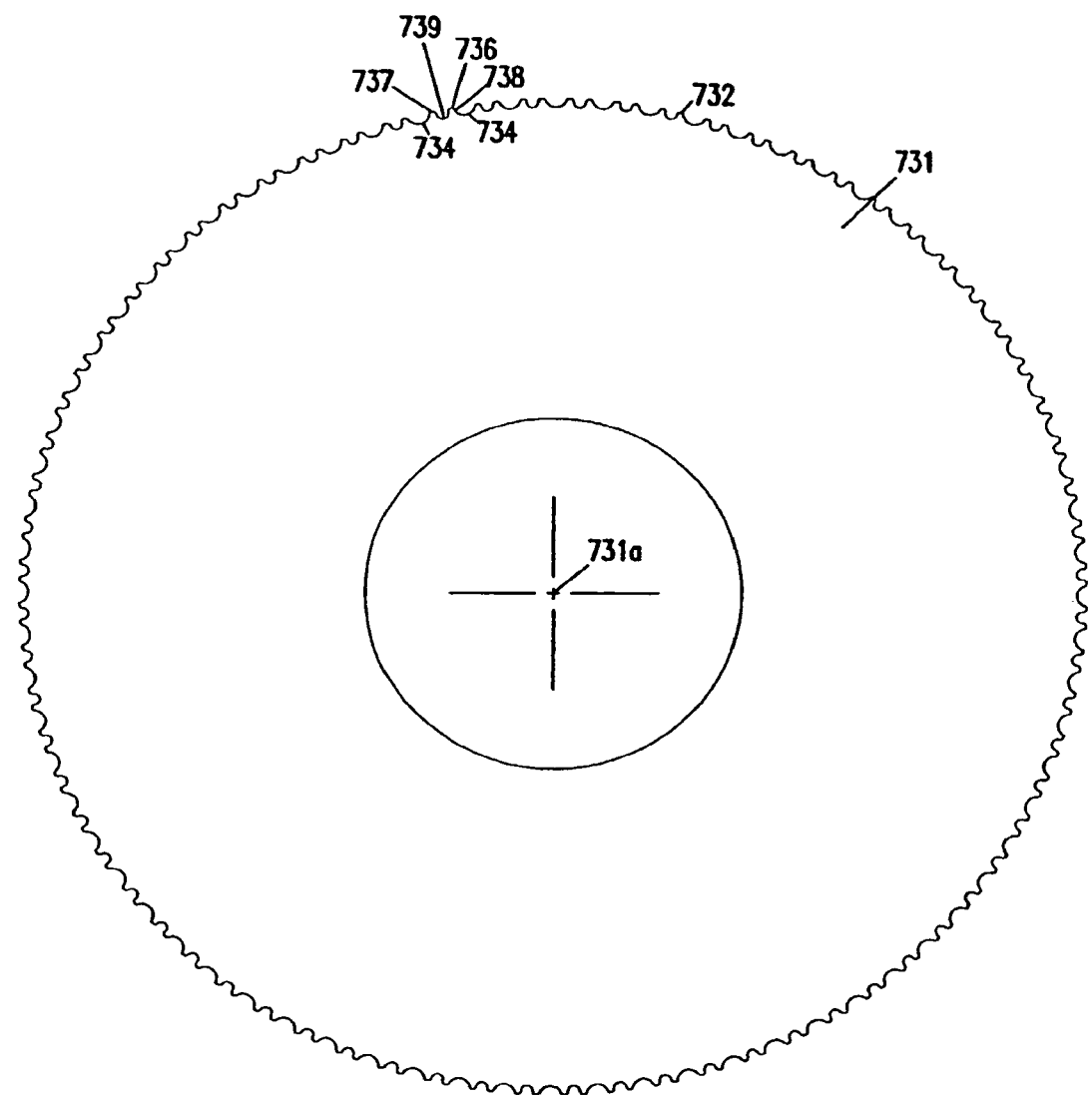
FIG. 42 is an end view of the inside support roller of FIG. 41.

Attention is directed to the side elevational view of wheel 731 shown in FIG. 42. Surface 732 can be viewed to comprise a series of troughs 734, configured to receive media troughs (or inverted ridges) on opposite sides of a corrugation ridge to be indented. Between each pair of troughs 734 is provided an indentation support 736 which preferably comprises opposite, radially outwardly projecting side projections 737, 738 and a recessed center 739.

Figure 43:
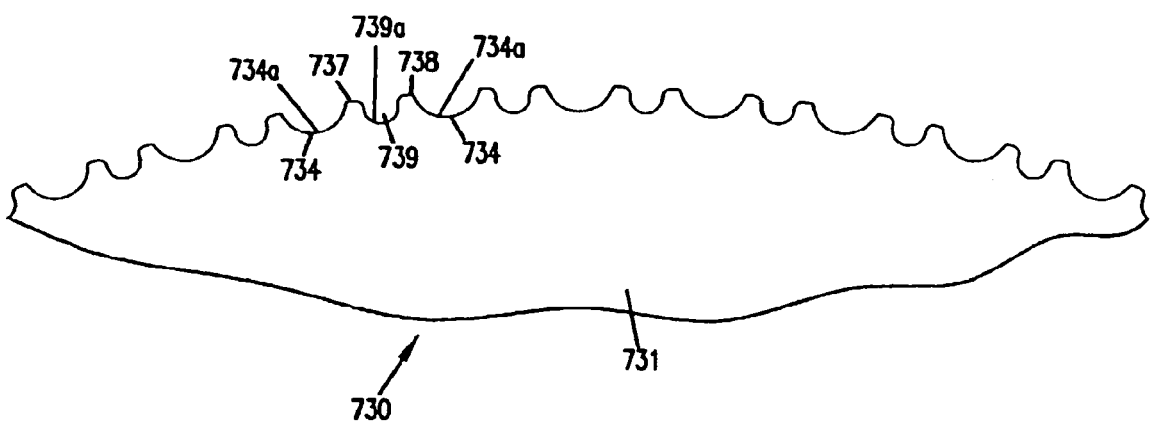
FIG. 43 is an enlarged, fragmentary view of a portion of the roller depicted in FIG. 42.

A portion of wheel 731 is depicted in enlarged view, in FIG. 43. The term "recessed" when used in connection with defining center 739, is meant to indicate that a bottom 739a of the recessed center 739 is preferably recessed in the direction of, but not necessarily as far as, bottoms 734a of the troughs 734.

In the embodiment of FIG. 43, each center 739 is recessed the same amount of the troughs 734. Typically and preferably each recessed center 739 has a bottom 739a which, in the cross-section shown in FIG. 43, has a radius about the same as the media thickness plus 0.5× the indention pin thickness.

In general, the surface definition of troughs 734 and sides 737, 738 is selected to correspond with corrugated media to be supported, during an indentation process. Partially recessed center 739 is generally sized to receive a projecting portion of an indentation pin arrangement, and a corresponding inverted or indented tip of corrugation media, during an indentation process. An example of this is shown in FIGS. 44 and 45.

Of course the recess center 739 should be sized to allow for room of the thickness of the media (twice) and the thickness of the indenting pin, during an indentation or deformation process. In this manner, the media will not likely be torn or substantially damaged, during the inside support deformation or indentation process.

Figure 44:
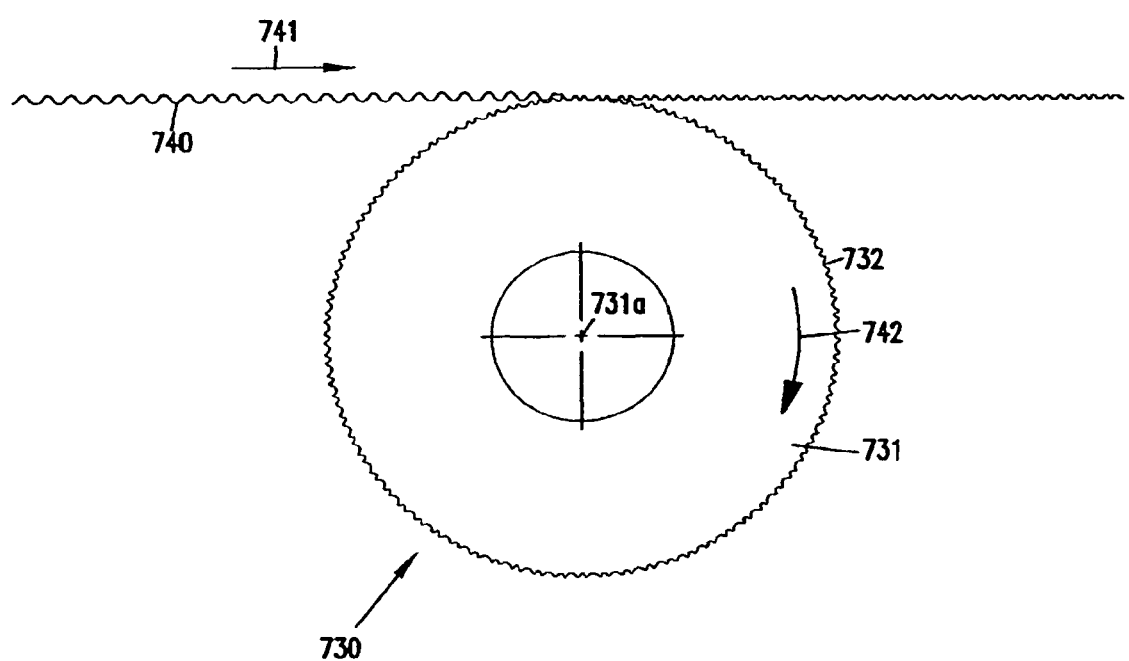
FIG. 44 is a schematic depiction of an inside support indentation process.

In general, wheel 731, FIG. 44, would be mounted on a bearing, in a typical process, to be rotated or driven by the corrugated media 740 as opposed to being independently driven. This will help ensure that the engaged and supported corrugations in the media are centrally positioned. In FIG. 44, the direction of movement of the media 740 is indicated at arrow 741, and the direction of rotation of wheel 731 by arrow 742.

Figure 45:
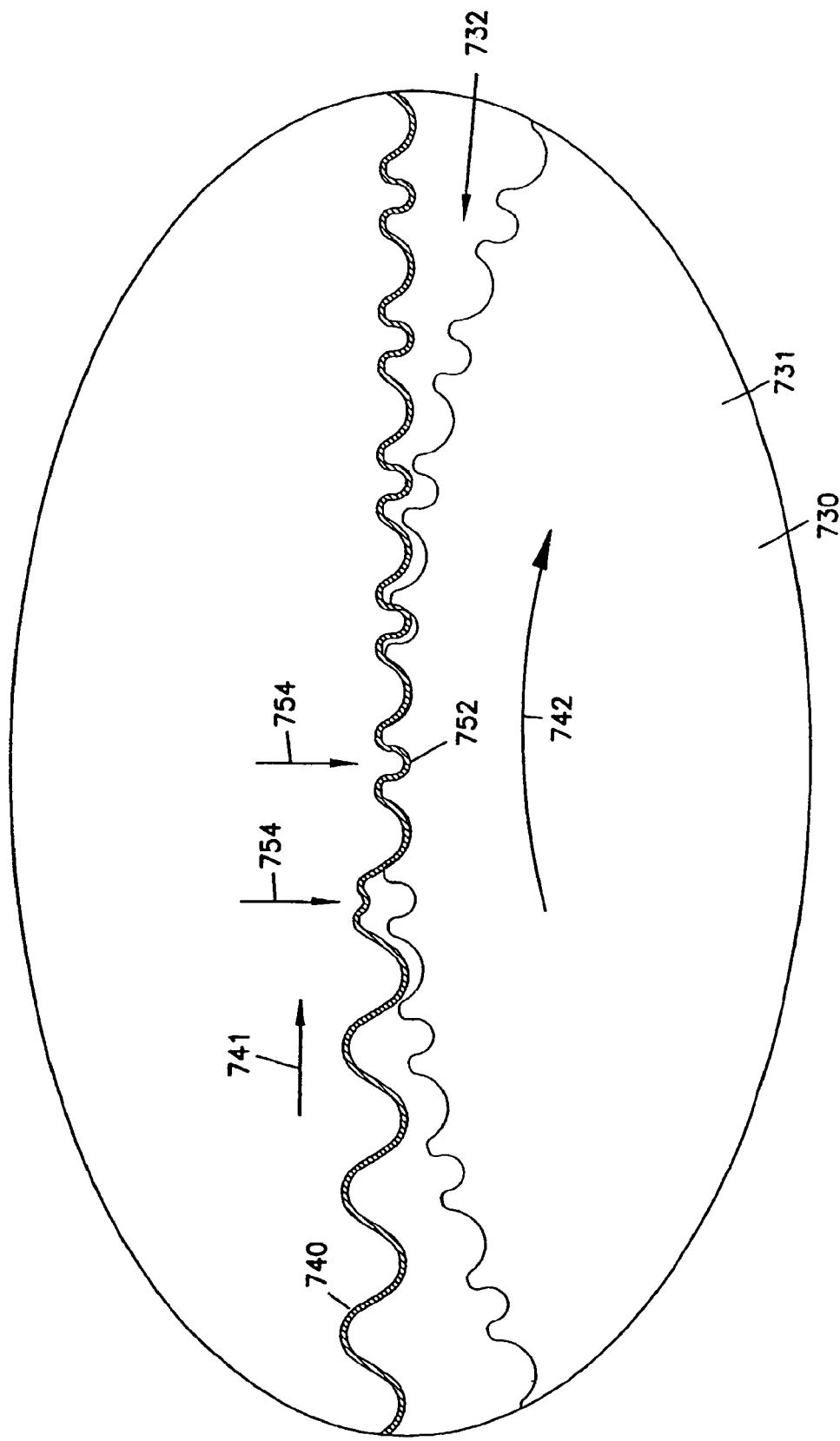
FIG. 45 is an enlarged view of a portion of FIG. 44.

Referring to FIG. 45, web 740 is shown being indented at 752, with inside support provided by roller 731. The web direction is indicated at arrow 741. The direction of indentation is shown at arrows 754.

Figure 46:
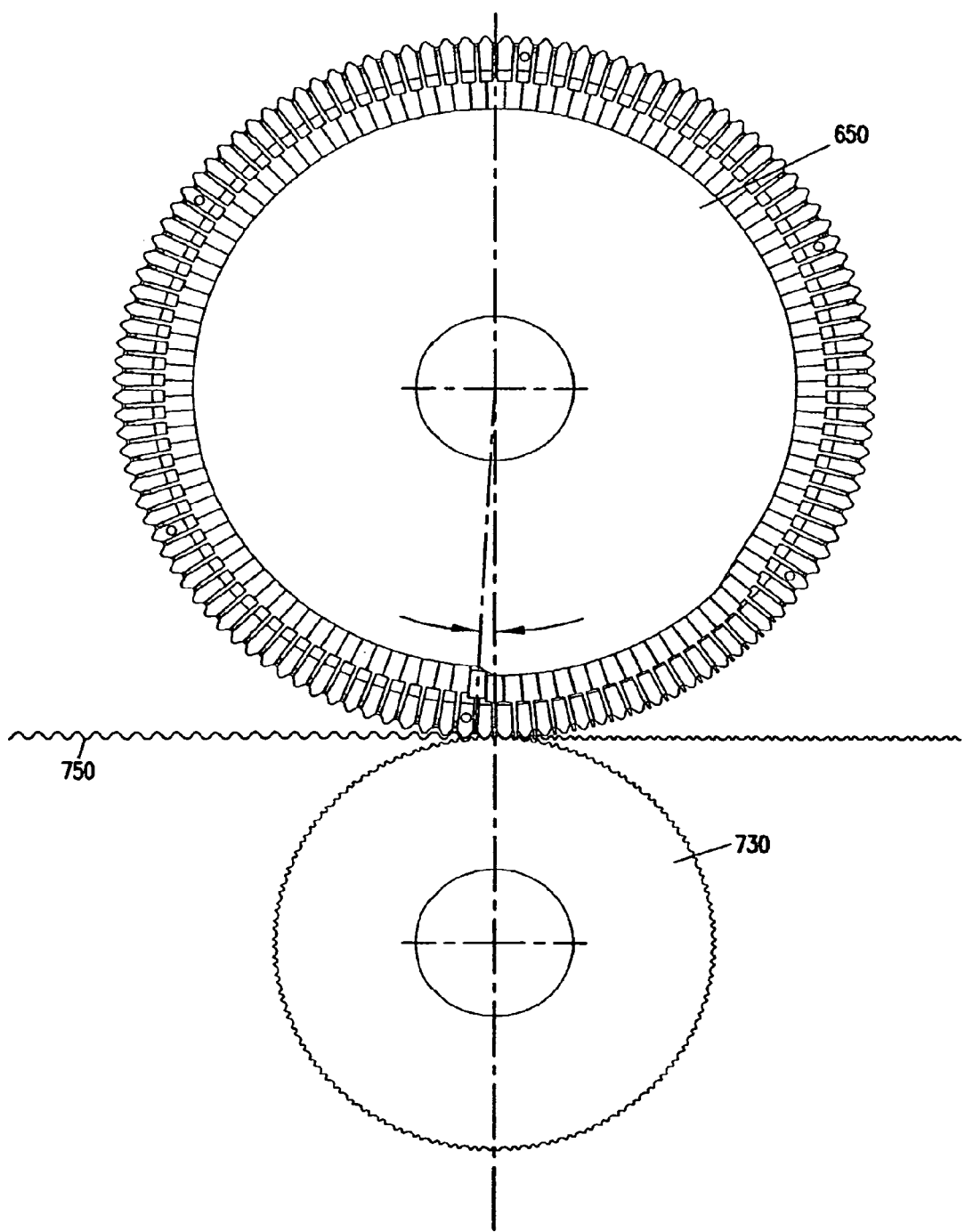
FIG. 46 is a schematic depiction of a step of encapsulated support according to the present disclosure.

Of course the indentation pin used with an inside support analogous to inside support 730, may be positioned on a wheel analogous to wheel 650, FIG. 32, if desired. When this is the case, as shown in FIG. 46, the process would be an encapsulation process for the corrugated media 750, to be indented.

In the process of FIG. 31, midweb darting was involved. For a midweb darting process, generally the indentation could be caused by an arrangement analogous to the wheel 650, FIG. 32. That is, with outside support and an underneath support roller that does not include corrugated support structure.

Figure 47:
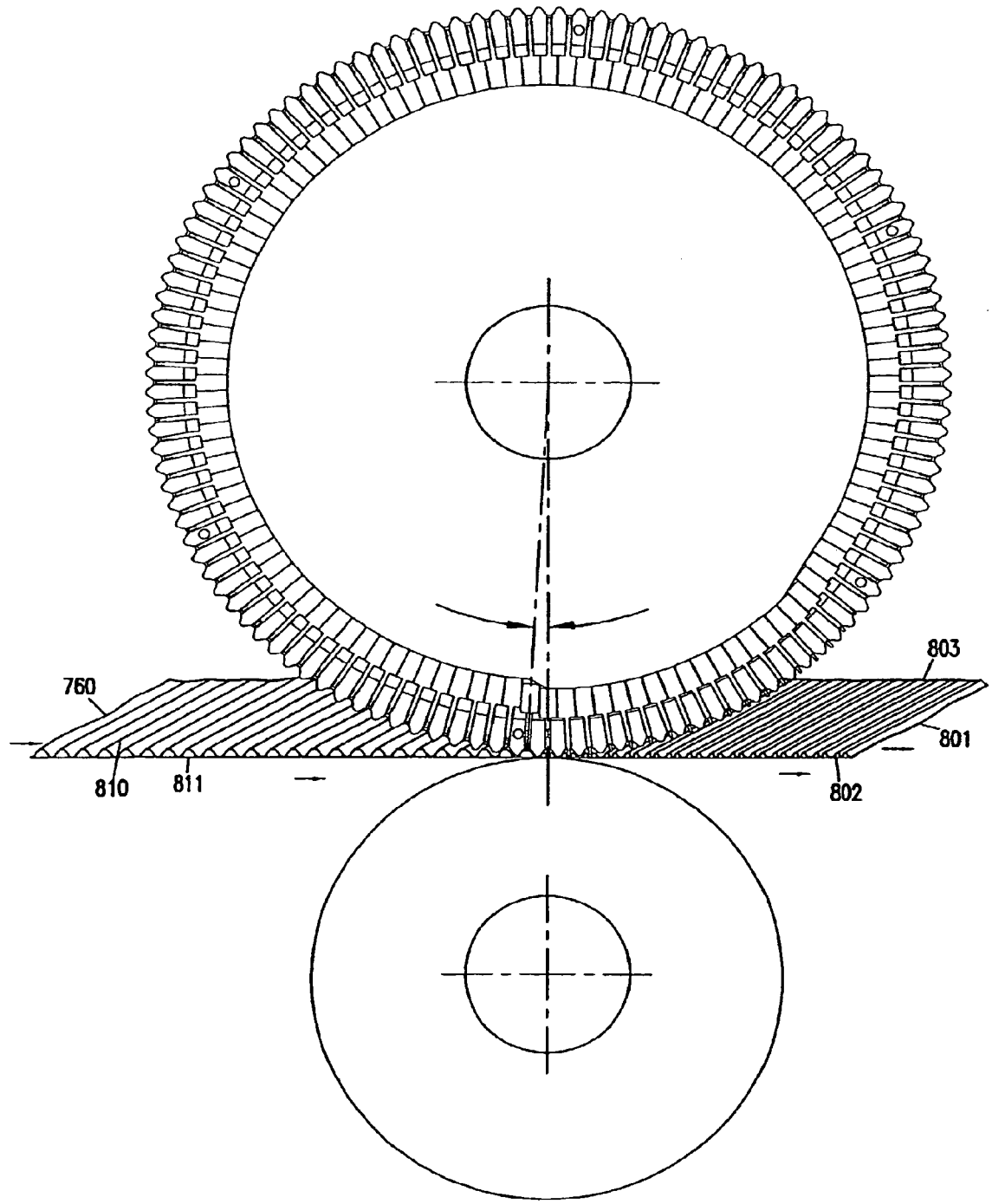
FIG. 47 is a schematic depiction of an edge folding process according to certain applications of techniques described in the present disclosure.

In some systems, it may be desirable to cause indentations at an edge of a web. In FIG. 47, an extension of web 760 is depicted. Web 760 has a center 801 and opposite edges 802, 803. The web 750 generally comprises a corrugated sheet 810 attached to a non-corrugated sheet 811. A corrugation process along the center 801 can be conducted as shown in FIG. 36. A corrugation process along either one of edges 802, 803, can be also conducted with a process analogous to that shown in FIG. 36, without inside support, as long as the indentation is directed against a ridge of the corrugated media 810, in the direction toward the non-corrugated media 811. Sealant could be prepositioned at along the edge, between the corrugated and non-corrugated media sheets 810, 811, to facilitate the process. Of course sonic welding could alternatively to used, in some systems. In FIG. 47, indentation at edge 802 is shown.

In some instances, it may be desirable to cause the indentation to be driven against a corrugation in an opposite direction from the non-corrugated media. An approach to this is shown in FIG. 48. In particular, in FIG. 48, a web corrugated media 850 secured to non-corrugated media 851 is shown. Along edge 855, the non-corrugated media 856 is shown folded away from surface 860 of the corrugated media. This exposes surface 860 to potential engagement for corrugation. An encapsulated process such as shown in FIG. 46, except with the indentation and outside support roller 861 engaging surface 862, and the receiver (or inside support) roller 865 engaging surface 866, can then be operated to cause indenting of each of the ridges 870 in the direction of arrow 880. After the process of darting or indenting, the non-corrugated media 856 can then be folded back into engagement with the corrugated media 850 along this region. With such an approach it may be desirable to have sealant provided on the corrugated sheet before indentation.

In general, as long as an appropriately flexible media is used for the non-corrugated media 851, this approach to darting can be conducted. It will be important to ensure that any tacking of the corrugated media to the non-corrugated media take place at a location sufficiently spaced from the edge at which indentation is to occur to allow for the folds 872. Typically, a distance for spacing of such tacking of at least 12 mm from the edge will be sufficient.

From the above techniques, an approach to creating corrugated media which has been darted at both ends can be understood. For example, the approach of FIG. 32 can be used to create a dart fold in each of the upwardly directed ridges of the media. An approach in accord with FIG. 48 can be used to create a dart or fold in each of the downwardly directed ridges in the same media. This can be used to create a media then which has each of the inlet flutes each folded closed at the downstream edge; and, each of the outlet flutes folded closed at the upstream edge.

D. Alternatives to Rollers

The particular folding arrangements shown, especially indentation arrangements, are depicted utilizing preferred roller configurations. Of course, alternatives can be used. For example, continuous belts can be configured to provide the support, if desired; and, they can be provided with appropriate slots therein, for indentation pin arrangements to project therethrough. However, the roller configurations depicted, which would typically use rollers on the order of about 150 mm to 300 mm in diameter for the indentation roller (FIG. 32) and about 150 mm to 300 mm in diameter for the receiver roller (FIG. 41), are convenient to manufacture and use.

E. Folding

For any of the processes of FIGS. 32, 46, 47 and 48, a follow-up step of folding media points 900, 901, FIG. 36a over, typically toward one another, to create the fold of FIG. 15 would be required. This can be conducted with roller 572, FIG. 31. The roller 572 would preferably be as described above.

IV. Some General Observations and Principles

In general, the techniques previously described can be used to provide for preferred fluted filter media constructions. In this context, the term "fluted filter media construction" is meant to refer to a filter construction which includes the media, whether the construction is the media itself or the media provided in the form of an overall serviceable filter element or cartridge, for example cartridges as shown in FIGS. 26 and 27.

The fluted filter media construction preferably comprises a corrugated sheet of filter media having a curved wave pattern of corrugations, preferably a regular curved wave pattern of straight corrugations as defined. The corrugations are such that a set of them define individuals flutes each having an end closure defined by regular fold arrangement in corresponding ones of the set of corrugations. The regular fold arrangement of each corrugation includes at least two folds. Typically for the preferred arrangements described, such as shown in FIG. 15, four folds are provided at each corrugation which is folded closed. For these, two of the folds are generally upper, inwardly directed folds and two of the folds are generally lower, outwardly directed folds.

The typical fluted filter media construction will comprise a sheet of corrugated media having individual flutes each closed by a regular fold arrangement, secured to a non-corrugated sheet of filter media. Typically the filter media construction will include such a combination of a corrugated sheet and a non-corrugated sheet configured to provide a filter cartridge having a set of inlet flutes and a set of outlet flutes, the inlet flutes each being closed to passage of unfiltered fluid therethrough, adjacent the outlet face and each outlet flute being closed, to passage of unfiltered fluid therein, adjacent the inlet face. The term "adjacent" in this context, is meant to refer to a closure that occurs within a distance 20% of the total length of the flute of the most adjacent face. Preferably the closure is within 10% of the length of the flute, of the most adjacent face. Preferably the closure of at least one of the sets of inlet flute and outlet flutes is by the regular fold pattern. In some instances both are closed by the regular fold pattern. When a corrugation or flute end is not closed by a fold, it may be closed by a barrier such as a sealant barrier, or in some other manner. Thus, in some instances a filter cartridge will contain a set of flutes folded closed at one face, and another set of flutes closed by a sealant barrier at another face.

In various filter media constructions, the corrugated sheet and the non-corrugated sheet can be jointly coiled to form a coiled media construction. The coiled media construction may be circular, or may be obround, for example race track shape. In other arrangements, the media would be used in the form of a stack of strips.

In a typical arrangement, the regular fold arrangement would include some sealant herein, to facilitate and maintain closure.

Also according to the present disclosure a process for manufacturing a filter media construction including a sheet of fluted (typically corrugated) filter media having curved wave pattern of corrugations is provided. The process generally includes steps of: (1) deforming a portion of a flute or corrugation to define at least one foldable tip; and (2) folding the at least one foldable tip over, to fold the flute or corrugation closed. Typically, two foldable tips in each corrugation are generated, and are folded over, preferably toward one another.

Preferably the process is conducted on a sheet of corrugated media having a curved wave pattern of corrugations. In many preferred applications, the sheet of corrugated filter media is secured to a sheet of non-corrugated media, to form a continuous web, prior to the step of indenting and folding.

The process may be conducted as a mid-web deformation and folding process, with follow-up slitting. It also may be conducted along a web edge. When conducted along an edge, it can be conducted in a direction toward the uncorrugated media, or, by folding the non-corrugated media out of the way, it can be conducted in a direction away from the non-corrugated media. Of course the process can be conducted on corrugated media that is not secured to non-corrugated media.

The deformation process can be conducted without support, or with outside support or inside support (or both) provided to a corrugation at a location longitudinally adjacent the location or deformation. By the term "longitudinally adjacent" in this context, it is meant that the support occurs in the same location as the deformation, except moved out of the way of the deformation pin arrangement which causes the deformation.

The deformation (typically a step of indenting) can be conducted with an indenting wheel, with a step of folding comprising pressing with a folding wheel. The indenting wheel may comprise a wheel having an outer corrugated surface, to provide for outside corrugation support, with at least one, and typically a plurality, of spaced indentation pins. The indentation pins may be mounted with a projection/retraction arrangement that allows the pins to be projected outwardly from the indenting wheel when indentation is to be conducted, and to be retracted out of the way, when desired.

In a typical process, the corrugated sheet or web would be formed by passing a non-corrugated sheet into the bite between corrugation rollers. In some processes sealant may be provided on the corrugated sheet prior to deformation, by providing the sealant on the web when it is passed into the corrugating rollers, to form the corrugated sheet. This can be advantageous for reasons previously discussed.

It will be understood that the techniques or principles and examples provided, can be provided and used in a variety of specific manners, to accomplish the desired results. The drawings and descriptions are intended to be exemplary only.

What is claimed is:

1. A process of manufacturing a filter media construction including a sheet of fluted media secured to a flat facing sheet of filter media; said process including steps of:
    (a) securing the sheet of fluted media to the sheet of flat facing media with a sealant to form a web of media; the fluted media including alternating ridges spaced by troughs, the troughs including a radiussed curve;
    (b) directing the web of media between a wheel and a roller arrangement to deform a portion of the flutes and form deformed flute closures at each respective deformed flute;
        (i) said step of directing the web of media between a wheel and roller arrangement is conducted spaced from opposite edges of the web along a mid-web to form a mid-web fold line; and
    (c) after the step of directing, splitting the web of media along the mid-web fold line to result in two pieces of web.

2. A process according to claim 1 further comprising:
    (a) coiling the web of media to form a filter media construction having a set of inlet flutes and a set of outlet flutes extending between an inlet face and an outlet face;
        (i) each inlet flute being closed to passage of unfiltered fluid therethrough, adjacent the outlet face; and
        (ii) each outlet flute being closed to passage of unfiltered fluid therethrough, adjacent the inlet face.

3. A process according to claim 2 wherein:
    (a) each inlet flute is closed to passage of unfiltered fluid therethrough, adjacent the outlet face, by the deformed flute closure.

4. A process according to claim 2 wherein:
(a) each outlet flute is closed to passage of unfiltered fluid therethrough, adjacent the inlet face, by the deformed flute closure.

5. A process according to claim 1 wherein:
(a) said step of directing the web of media between a wheel and roller arrangement includes directing the web of media between a first wheel and roller arrangements followed by a second wheel and roller arrangement.

6. A process according to claim 5 wherein:
(a) the step of directing the web of media between a wheel and roller arrangement includes directing the web between an indenting wheel and roller to deform a portion of the flutes.

7. A process according to claim 6 wherein:
(a) the step of directing includes indenting the portion of the flutes with the indenting wheel which is part of the first wheel and roller arrangement; and then
(b) pressing with a folding wheel, which is part of the second wheel and roller arrangement.

8. A process according to claim 7 wherein:
(a) the step of directing includes indenting the portion of the flutes to form two foldable tips; and then
(b) folding the two foldable tips toward one another to form the deformed flute closures.

9. A process according to claim 1 wherein:
(a) said step of directing includes indenting a selected flute that is supported, at a region longitudinally adjacent where deformation will occur, by a support arrangement including at least one of:
  (i) an outside support; and
  (ii) an inside support.

10. A process according to claim 1 including steps of:
(a) forming the fluted media by passing a web of non-corrugated media into a bite between a pair of corrugating rollers; and
(b) applying sealant to the web of non-corrugated media before being formed to the fluted media by applying the sealant before the media is corrugated.

11. A process of manufacturing a filter media construction including a sheet of fluted media secured to a flat facing sheet of filter media; said process including steps of:
(a) securing the sheet of fluted media to the sheet of flat facing media with a sealant to form a web of media; the fluted media including alternating ridges spaced by troughs, the troughs including a radiussed curve;
(b) directing the web of media between a wheel and a roller arrangement to deform a portion of the flutes and form deformed flute closures at each respective deformed flute;
  (i) the step of directing includes indenting the portion of the flutes with an indenting wheel which is part of the first wheel and roller arrangement to form two foldable tips;
  (ii) folding the two foldable tips toward one another to form the deformed flute closures; and
(c) pressing with a folding wheel, which is part of a second wheel and roller arrangement.

\* \* \* \* \*